US012592324B2

(12) United States Patent
Venneri et al.

(10) Patent No.: US 12,592,324 B2
(45) Date of Patent: Mar. 31, 2026

(54) RADIATION SHIELDING FOR COMPACT AND TRANSPORTABLE NUCLEAR POWER SYSTEMS

(71) Applicant: LOKI MMR INC., New York, NY (US)

(72) Inventors: Paolo Francesco Venneri, Seattle, WA (US); Michael John Eades, Seattle, WA (US); Vishal Patel, Seattle, WA (US)

(73) Assignee: LOKI MMR INC., New York, NY (US)

( * ) Notice: Subject to any disclaimer, the term of this patent is extended or adjusted under 35 U.S.C. 154(b) by 490 days.

(21) Appl. No.: 18/013,999

(22) PCT Filed: Sep. 18, 2021

(86) PCT No.: PCT/US2021/051004
§ 371 (c)(1),
(2) Date: Dec. 30, 2022

(87) PCT Pub. No.: WO2022/061195
PCT Pub. Date: Mar. 24, 2022

(65) Prior Publication Data

US 2023/0290528 A1 Sep. 14, 2023

Related U.S. Application Data

(60) Provisional application No. 63/080,292, filed on Sep. 18, 2020.

(51) Int. Cl.
*G21C 11/02* (2006.01)
*G21C 13/02* (2006.01)
(Continued)

(52) U.S. Cl.
CPC ............ *G21C 11/022* (2013.01); *G21C 11/02* (2013.01); *G21C 13/02* (2013.01); *G21D 5/02* (2013.01); *G21F 5/00* (2013.01)

(58) Field of Classification Search
CPC .......... G21C 11/02; G21C 11/022–024; G21C 11/06; G21C 13/02; G21D 1/02; G21D 3/04; G21D 5/02; G21F 5/00
(Continued)

(56) References Cited

U.S. PATENT DOCUMENTS 2,868,992 A * 1/1959 Monk .................... G21C 19/14
250/517.1
3,208,914 A * 9/1965 Dickson ................... G21C 7/14
976/DIG. 126
(Continued)

FOREIGN PATENT DOCUMENTS

CN 109411103 A * 3/2019 ............. G21F 1/106
WO 2021067901 A1 4/2021
WO 2021067903 A1 4/2021

OTHER PUBLICATIONS

Bullinger, C. F., and J. M. Harrer. Cost Study of a 100-Mw (e) Direct-cycle Boiling Water Reactor Plant. No. ANL-6178. Argonne National Lab., III., 1960. (Excerpt) (Year: 1960).*
(Continued)

*Primary Examiner* — Jinney Kil
(74) *Attorney, Agent, or Firm* — Sikand IP Law PLLC

(57) ABSTRACT

A mobile reactor radiation shielding solution prevents activation of structural materials to reduce a radiation dosage risk to living organisms and accelerates timetables for transport. The shielding solution can include: in-vessel neutron shield, in-vessel shadow shield, transport shield, and module shadow shield. In-vessel neutron shield reduces and prevents the activation of the structural materials and significantly reduces the need for heavy shielding to shield against
(Continued)

the gamma emissions from activated structural materials. In-vessel shadow shield provides neutron and gamma shielding between the reactor and a balance-of-plant (BOP) module and control system. In-vessel shadow shield is placed near the active nuclear core to minimize size of the shield while maximizing the protected arc to shield radiation workers while preparing the nuclear reactor for transport. Transport shield is used during transportation when living organisms come into proximity of the reactor. Module shadow shield shields reactor control components and BOP module during operation.

29 Claims, 12 Drawing Sheets

(51) Int. Cl.
*G21D 5/02* (2006.01)
*G21F 5/00* (2006.01)

(58) Field of Classification Search
USPC .......................................... 376/287, 293, 909
See application file for complete search history.

(56) References Cited

U.S. PATENT DOCUMENTS

| | | | | |
|---|---|---|---|---|
| 3,239,422 | A | 3/1966 | Hugh | |
| 3,266,999 | A * | 8/1966 | Wood | G21C 1/10 376/400 |
| 3,752,738 | A * | 8/1973 | Naymark | G21C 9/00 376/293 |
| 4,090,087 | A | 5/1978 | Weissenfluh | |
| 4,447,734 | A | 5/1984 | Kusumegi et al. | |
| 4,743,423 | A | 5/1988 | Turner et al. | |
| 9,299,464 | B2 | 3/2016 | Venneri et al. | |
| 9,620,248 | B2 | 4/2017 | Venneri | |
| 10,032,528 | B2 | 7/2018 | Venneri | |
| 10,109,378 | B2 | 10/2018 | Snead | |
| 10,229,757 | B2 | 3/2019 | Filippone et al. | |
| 10,475,543 | B2 | 11/2019 | Venneri | |
| 10,573,416 | B2 | 2/2020 | Venneri | |
| 10,643,754 | B2 | 5/2020 | Venneri et al. | |
| 2013/0083878 | A1 | 4/2013 | Massie et al. | |
| 2013/0334444 | A1 | 12/2013 | Shimazu et al. | |
| 2016/0027536 | A1 * | 1/2016 | Mcclure | G21F 5/14 376/277 |
| 2017/0372809 | A1 | 12/2017 | Ham | |
| 2020/0027587 | A1 | 1/2020 | Venneri | |
| 2021/0005335 | A1 | 1/2021 | Snead | |
| 2021/0082591 | A1 * | 3/2021 | Cella | B63B 75/00 |

OTHER PUBLICATIONS

Bahrin, Muhammad Hannan, et al. "Characterization of ZnBr2 solution as a liquid radiation shield for mobile hot cell window." AIP Conference Proceedings. vol. 1799. No. 1. AIP Publishing LLC, 2017. (Year: 2017).*

International Search Report and Written Opinion for International Application No. PCT/US2021/051004, mailed Mar. 17, 2022, 12 pages.

The Extended European Search Report issued Jan. 18, 2024, by the European Patent Office in corresponding European Patent Application No. 21870345.2-1212. (21 pages).

* cited by examiner

FIG. 6

Table of Weights 600

| | Component | Weight (lbs) |
|---|---|---|
| **Nuclear Heat Supply (NHS) Module 150** | Nuclear Reactor Core 101, Pressure Vessel 160, Shields 153, 154 | 23,142 |
| | Intermediate Heat Exchanger 171 and Gas Circulator 172 | 6,061 |
| | Reactor Container 151 | 5,290 |
| | Shielding 155, 157 | 7,714 |
| | Miscellaneous NHS | 2,010 |
| | NHS Module Subtotal 605 | 44,217 |
| **Balance-of-Plant (BOP) Module 170** | Turbomachinery 173 | 1,713 |
| | Generator 174 & Gearbox | 9,676 |
| | Heat Exchange Interface 176 | 440 |
| | Instrumentation and Reactor Control System 175 | 88 |
| | BOP Container 177 | 2,645 |
| | Miscellaneous BOP | 1,309 |
| | BOP Module Subtotal | 15,871 |
| | Total Nuclear Reactor System Mass 615 | 60,088 |

Absolute Photon Dose in Lead Nitrate-Saturated Water Heat Map 800

RADIATION SHIELDING FOR COMPACT AND TRANSPORTABLE NUCLEAR POWER SYSTEMS

CROSS-REFERENCE TO RELATED APPLICATIONS

This application is a U.S. National Phase Application of International Application No. PCT/US2021/051004, filed on Sep. 18, 2021, the entirety of which is incorporated by reference herein. International Application No. PCT/US2021/051004 claims priority to U.S. Provisional Patent Application No. 63/080,292, filed on Sep. 18, 2020, titled "Radiation Shielding for Compact and Transportable Nuclear Power Systems," the entire disclosure of which is incorporated by reference herein.

TECHNICAL FIELD

The present subject matter relates to examples of a nuclear reactor system, such as nuclear reactor transportation systems and transportable nuclear reactor systems. The present subject matter also encompasses radiation shielding for compact and transportable nuclear power systems.

BACKGROUND

Safe, reliable, and robust electrical power is indispensable to modern civilian and military operations. Operations occurring in remote, undeveloped, or contested areas of the world often have the same or more extensive requirements than operations occurring within the network of a contemporary power grid. Traditionally, petrochemical power generation has been used in remote operations, such as within the arctic circle or within active war zones, to supply power to critical infrastructure. However, the logistical supply lines for providing processed petrochemicals to a power plant, portable or otherwise, can be easily disrupted by adverse weather, shifting political restrictions, and blockades by adverse militia forces. Natural energy sources, such as wind turbines and solar panels, while not affected by protectionist behavior at borders, are still susceptible to cloudy weather and wind doldrums. Nuclear power deployments, which have self-contained fuel supplies designed to consistently run for upwards of a decade, are a solution to fickle or determined outside forces interrupting power supply.

Nuclear power deployments traditionally are extremely fixed in nature: massive concrete works are poured, and the structures once completed are fixed in position. These fixed structures are not suited to operations with a mobile core of power needs: sending power from a traditional power plant to a moving mining operation or a military division requires running electrical lines, and falls prey to the same issues as any other fixed-in-place power supply. Furthermore, traditional nuclear power deployments can take years to decommission and move. In many remote settings, this extensive lag period is an unacceptable burden to providing temporary robust power.

A modular transportable nuclear generator is described in U.S. Pat. No. 10,229,757, issued Mar. 12, 2019, titled "Modular Transportable Nuclear Generator," the entirety of which is incorporated by reference herein. Unfortunately, transportation of a nuclear generator typically requires waiting a long period of time before transport to minimize the radiation dosage risk of nuclear radiation to living organisms and the public.

SUMMARY

Hence, there is room for further improvement in nuclear reactor transportation systems and transportable nuclear reactor systems. To enable more rapid transport of a nuclear reactor 107, a mobile reactor radiation shielding solution is described herein that prevents activation of structural materials to reduce the radiation dosage risk to the public and accelerates timetables for transport. The shielding solution addresses the shielding needs of a mobile nuclear reactor 107. Specifically, the shielding solution provides necessary shielding during operation, shutdown, and transport. Shielding during operation requires two aspects to be addressed: reducing activation of structural materials and minimizing radiation dose to operators. During shutdown and transport, the shielding is focused on minimizing the radiation dose to personnel transporting the reactor and the public that may be close to the reactor during transport. Additionally, the mass of the shielding is minimized in order to enable transport.

A nuclear reactor system 100 implementing the transportable nuclear reactor technologies disclosed herein increases the portability of a nuclear power system. In contrast to other portable power systems, or other nuclear power systems, the transportable nuclear reactor technologies allow a portable nuclear reactor 107 to be transported safely. For example, the nuclear reactor 107 can be transported by a semi-truck safely through populated areas; perform a black-start within seventy-two hours from nuclear reactor arrival, and be safely removed within seven days of reactor shutdown. The transportable nuclear reactor technologies allow for a plug-and-play design, separating a balance-of-plant (BOP) module 170 from a nuclear heat supply (NETS) module 150, and improve mass efficiency enough to allow for the BOP module 170 and the NETS module 150 to be transportable by a land vehicle 501, transport aircraft 502, or watercraft 503.

In an example, a nuclear reactor system 100 includes a nuclear heat supply (NHS) module 150. The NHS module 150 includes a reactor container 151. The reactor container 151 includes a reactor cavity 152. The NHS module 150 further includes a pressure vessel 160 within the reactor container 151. The pressure vessel 160 includes an interior wall 161. The NHS module 150 further includes a nuclear reactor core 101 located within the pressure vessel 160. The nuclear reactor core 101 includes a plurality of fuel elements 104A-N and at least one moderator element 103A. The NHS module 150 further includes an in-vessel neutron shield 153 located on the interior wall 161 of the pressure vessel 160 to surround the nuclear reactor core 101. The NHS module 150 further includes an in-vessel shadow shield 154 inside the pressure vessel 160. The NHS module 150 further includes a transport shield (TS) 155 within the reactor container 151 and outside the pressure vessel 160 that includes a TS chamber 156 within the reactor cavity 152 for containing a first moderating fluid 159A. The NHS module 150 further includes a module shadow shield (MSS) 157 within the reactor container 151 and outside the pressure vessel 160 that includes an MSS chamber 158 within the reactor cavity 152 for containing a second moderating fluid 159B.

In a second example, a nuclear reactor deployment method 400 includes transporting a nuclear heat supply (NHS) module 150 including a nuclear reactor core 101 from a first location to a second location. The nuclear reactor deployment method 400 further includes coupling the NHS module 150 to ground in the second location. The nuclear reactor deployment method 400 further includes after transporting the NHS module 150 from the first location, substantially filling a transport shield (TS) chamber 156 with a first moderating fluid 159A. The nuclear reactor deployment method 400 further includes after substantially filling the TS chamber 156 with the first moderating fluid 159A, increasing a neutron flux of the nuclear reactor core 101 to a critical level.

In a third example, a nuclear reactor shielding method 500 includes substantially filling a transport shield chamber 156 of a nuclear heat supply (NHS) module 150 of a nuclear reactor system 100 with a first moderating fluid 159A. The NHS module 150 includes a nuclear reactor core 101. The nuclear reactor shielding method 500 further includes transporting the NHS module 150 from a first location to a second location. The nuclear reactor shielding method 500 further includes substantially draining the transport shield chamber 156 of the first moderating fluid 159A.

Additional objects, advantages and novel features of the examples will be set forth in part in the description which follows, and in part will become apparent to those skilled in the art upon examination of the following and the accompanying drawings or may be learned by production or operation of the examples. The objects and advantages of the present subject matter may be realized and attained by means of the methodologies, instrumentalities and combinations particularly pointed out in the appended claims.

BRIEF DESCRIPTION OF THE DRAWINGS

The drawing figures depict one or more implementations, by way of example only, not by way of limitations. In the figures, like reference numerals refer to the same or similar elements.

FIG. 6 is a table of weights containing a projected or estimated weight of various components of the nuclear reactor system.

PARTS LISTING

Figure 1A:
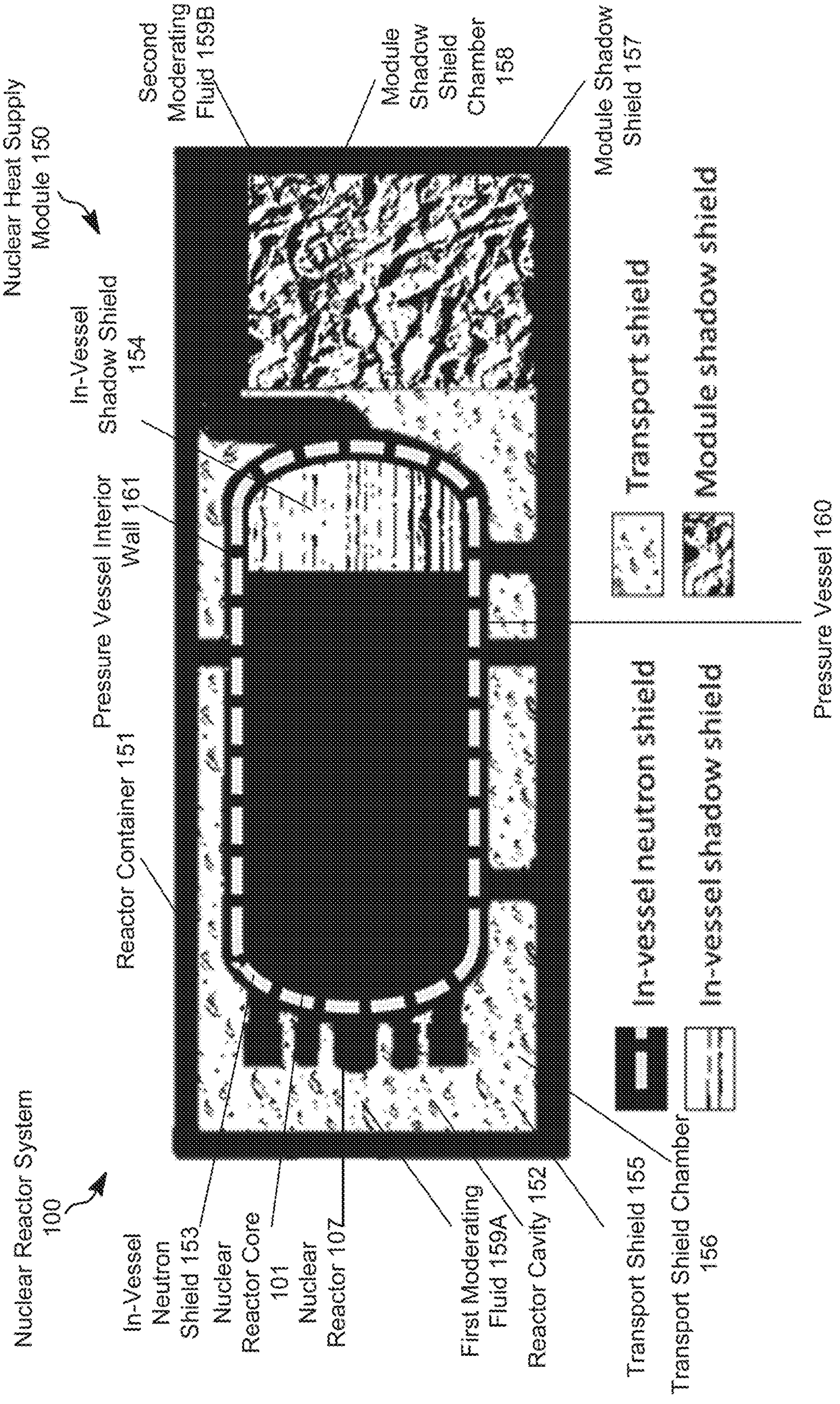
FIG. 1A is a cutaway view of a nuclear reactor system that depicts a nuclear heat supply module and implements a shielding solution that includes: (1) an in-vessel neutron shield, (2) an in-vessel shadow shield, (3) a transport shield, and (4) a module shadow shield.

100 Nuclear Reactor System
101 Nuclear Reactor Core
102A-N Insulator Elements
103A-N Moderator Elements
104A-N Fuel Elements
107 Nuclear Reactor
112 Insulator Element Array
113 Moderator Element Array
114 Nuclear Fuel Tile Array
115A-N Control Drums
116 Reflector Material
117 Absorber Material
140 Reflector
141A-N Reflector Blocks
142A-N Fuel Coolant Passages
150 Nuclear Heat Supply (NETS) Module
151 Reactor Container
152 Reactor Cavity
153 In-Vessel Neutron Shield
154 In-Vessel Shadow Shield
155 Transport Shield (TS)
156 Transport Shield (TS) Chamber
157 Module Shadow Shield (MSS)
158 Module Shadow Shield (MSS) Chamber
159A First Moderating Fluid
159B Second Moderating Fluid
160 Pressure Vessel
161 Pressure Vessel Interior Wall
170 Balance-of-Plant Module
171 Heat Exchanger
172 Gas Circulator
173 Turbomachinery
174 Generator
175 Reactor Control System
176 Heat Exchange Interface
177 Balance-of-Plant Container
180 Gas Connector Line
190A In-Vessel Shadow Shield Unprotected Arc
190B In-Vessel Shadow Shield Protected Arc
191A Module Shadow Shield Unprotected Arc
191B Module Shadow Shield Protected Arc
192A-I Radiation Particles
250 Auxiliary Supply Module
270 Balance-of-Plant Module
275 Control Module
400 Nuclear Reactor Deployment Method
405-425 Nuclear Reactor Deployment Method Steps
500 Nuclear Reactor Shielding Method
501 Land Vehicle
502 Aircraft
503 Watercraft
505-560 Nuclear Reactor Shielding Method Steps
600 Table of Weights

605 NHS Module Subtotal
610 BOP Module Subtotal
615 Total Nuclear Reactor System Mass
700 Relative Photon Dose in Lead Nitrate-Saturated Water Heat Map
705 Relative Photon Dose of Lead Nitrate-Saturated Water Compared to Water
710 Distance from Reactor Core Horizontally
715 Distance from Reactor Core Vertically
800 Absolute Photon Dose in Lead Nitrate-Saturated Water Heat Map
805 Absolute Photon Dose of Lead Nitrate-Saturated Water

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

The term "coupled" as used herein refers to any logical or physical connection. Unless described otherwise, coupled elements or devices are not necessarily directly connected to one another and may be separated by intermediate components, elements, etc. The term "fluid communication" as used herein means that a substance, such as a liquid or a gas, can flow. The terms "block," "blocks," "blocked," or "blocking" as used herein when referring to a respective radiation particle 192A-I means to absorb, reflect, deflect, or moderate the respective radiation particle 192A-I.

The term "substantially filling" as used herein means occupying by fifty to one-hundred percent. The term "substantially fills" as used herein means occupies by fifty to one-hundred percent. The term "substantially filled" as used herein means occupied by fifty to one-hundred percent. The phrase "substantially draining" as used herein means emptying by ninety to one-hundred percent. The phrase "substantially drained" as used herein means emptied by ninety to one-hundred percent.

Unless otherwise stated, any and all measurements, values, ratings, positions, magnitudes, sizes, angles, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±5% or as much as ±10% from the stated amount. The term "approximately" means that the parameter value or the like varies up to ±10% from the stated amount.

The orientations of the nuclear reactor system 100, nuclear reactor 107, nuclear reactor core 101, nuclear heat supply module 150, balance-of-plant module 170, associated components, and/or any nuclear reactor system 100 incorporating the nuclear reactor core 101, fuel elements 104A-N, control drums 115A-N, in-vessel neutron shield 153, in-vessel shadow shield 154, transport shield 155, or module shadow shield 157, such as shown in any of the drawings, are given by way of example only, for illustration and discussion purposes. In operation for a particular nuclear reactor system 100, the components may be oriented in any other direction suitable to the particular application of the nuclear reactor system 100, for example upright, sideways, or any other orientation. Also, to the extent used herein, any directional term, such as lateral, longitudinal, up, down, upper, lower, top, bottom, and side, are used by way of example only, and are not limiting as to direction or orientation of any nuclear reactor system 100 or component of the nuclear reactor system 100 constructed as otherwise described herein.

The transportable nuclear reactor technologies disclosed herein substantially increase the portability of a nuclear power system 100 to improve the speed of deployment and teardown, improve power production stability, and reduce fuel supply dependency during operation. Key to the success of the nuclear power system 100 is the novel approach to radiation shielding. Whereas traditional shielding is centered around building heavy radiation protection barriers around the nuclear reactor core 101, the nuclear reactor system 100 focuses on using a multi-layered radiation strategy focused on minimizing activation of structural materials and using in-situ materials and resources for shielding during operation. This results in a nuclear reactor system 100 that is lightweight and capable of being moved in less than ten days after shutdown, for example.

Specifically, the shielding solution provides necessary shielding during operation, shutdown, and transport. Shielding during operation requires two aspects to be addressed: reducing activation of structural materials and minimizing radiation dose to operators. During shutdown and transport, the shielding is focused on minimizing radiation dose to personnel transporting the reactor and the public that may be close to the nuclear reactor 107 during transport. An additional requirement is that the mass of the shielding must be minimized in order to enable transport.

The mobile nuclear reactor system 100 radiation shielding solution is comprised of four shields integrated in the nuclear heat supply (NETS) module 150: (1) an in-vessel neutron shield 153, (2) an in-vessel shadow shield 154, (3) a transport shield (TS) 155, and (4) a module shadow shield (MSS) 157. The in-vessel neutron shield 153 will reduce activation of the pressure vessel 160 and the surrounding structures by reducing the neutron fluence leaving the nuclear reactor core 101. The in-vessel shadow shield 154 will allow for radiation workers to approach one side of the NHS module 150 to prepare it for transport while remaining below mandated dose limits. The transport shield 155 can include a first moderating fluid 159A substantially filling the reactor cavity 152 of the NHS module 150, for example a hydrogen bearing liquid (such as water) substantially filling the TS chamber 156. The transport shield 155 may be implemented after shutdown of the nuclear reactor 107 to allow the NHS module 150 to be transported over land through public area and remain below public dose limits. The first moderating fluid 159A of the transport shield 155 can be drained prior to the NHS module 150 being loaded into an aircraft 502 for transport. The module shadow shield 157 can be placed in the NHS module 150 on the other side of the nuclear reactor 107 inlet/outlet to allow for the balance-of-plant module 170 to be placed in closer proximity to the NHS module 150 and accessed by base-personnel. The module shadow shield 157 can include an empty MSS chamber 158 during transport, which during installation is substantially filled with a second moderating fluid 159B, such as water or other onsite materials during installation. The module shadow shield 157 can be filled with water, as water will easily fill in all of the voids in the MSS chamber 158.

The four shields integrated in the NHS module 150 comprise a shielding solution, which itself is comprised of four elements: (1) the in-vessel neutron shield 153, (2) the in-vessel shadow shield 154, (3) the transport shield (TS) 155, and (4) a module shadow shield (MSS) 157. The shielding solution described herein is applicable to both terrestrial and space nuclear reactor systems 100. All four components can be applied together, individually, or in different combinations to meet the shielding, mass, volume, and operating requirements of the nuclear reactor system 100. This shielding solution can be the baseline shielding solution for any mobile nuclear reactor 107.

The transportable nuclear reactor technologies can utilize fully ceramic microencapsulated (FCM™) TRISO based fuel and a ceramic conductive “armored” core using silicon carbide. In both cases fully dense, structural silicon carbide can replace the graphite traditionally used in high temperature gas-cooled reactors, introducing improvements in strength, resistance to external hazards, and radioactivity retention. Deployment of the nuclear reactor system 100 will facilitate rapid deployment of remote bases, greatly enhance the mobility of temporary bases, and dramatically reduce potential damage and other risks associated with base resupply.

Reference now is made in detail to the examples illustrated in the accompanying drawings and discussed below. FIG. 1A is a cutaway view of a nuclear reactor system 100 that depicts a nuclear heat supply (NHS) module 150 and implements a shielding solution. The shielding solution includes: (1) an in-vessel neutron shield 153, (2) an in-vessel shadow shield 154, (3) a transport shield 155, and (4) a module shadow shield 157. The NHS module 150 includes a reactor container 151. This reactor container 151 in this example is a shipping container in the style of a CONEX or ISO box. The reactor container 151 can be approximately twenty feet long, and is configured to mount and house the nuclear reactor 107 in a safe and stable manner. The void space within the reactor container 151 forms a reactor cavity 152 (e.g. an interior volume), within which the nuclear reactor 107 resides. Within the reactor cavity 152 is a transport shield (TS) chamber 156 (e.g. a first chamber). The TS chamber 156 can be impermeable to fluid (e.g., watertight) after being substantially filled with the first moderating fluid 159A, either because the reactor container 151 is watertight, or because a sealant or envelope interior to the reactor cavity 152 makes the TS chamber 156 watertight. The reactor container 151 or a sub-chamber of the reactor container 151 needs to be able to contain the first moderating fluid 159A. The reactor cavity 152 in some examples may itself be the TS chamber 156 if there is no further dividing walls or volumes within the reactor cavity 152 to subdivide the reactor cavity 152.

In most circumstances, the shape and volume of the TS chamber 156 conforms to the dimensions of the reactor cavity 152, meaning that the TS chamber 156 is shaped like a right rectangular prism or can be a rounded shape if the reactor container 151 is shaped like a capsule. In some embodiments, however, the TS chamber 156 may conform to the dimensions of the nuclear reactor 107, meaning that the TS chamber 156 would be generally shaped like a capsule, with a diameter larger than the diameter of the nuclear reactor 107, but a diameter less than or equal to the width or height of the reactor container 151.

The reactor container 151 is designed to be transported by any means conventional to a shipping or storage container in the style of a CONEX or ISO box, which are typically a large metal, weather-resistant container used to store or transport items. The reactor container 151 can be placed on a truck bed, trailer, or rail car of a land vehicle 501 like a semi-trailer truck or train; on an aircraft 502 such as the Lockheed Hercules™ C-100 or C-130™; or a watercraft 503, such as a ship. The nuclear reactor 107 is mounted within the reactor container 151, and is designed to withstand expected shocks, drops, temperature changes, pressure changes, humidity, and any other typical environmental effects the contents of a CONEX or ISO box is expected to withstand. Additionally, the nuclear reactor 107 in a military setting may experience higher accident probabilities than any commercial power system. The attractiveness of the NHS module 150 as a target and possibility of accidents during transport make the resiliency and safety of the nuclear reactor 107 paramount. Therefore, the nuclear reactor 107 has large material temperature margins, strong negative reactivity feedback, and near complete fission product retention.

Within the reactor container 151 in the reactor cavity 152, mounted near the nuclear reactor 107, is a module shadow shield (MSS) chamber 158 (e.g. a second chamber). The MSS chamber 158 can also be impermeable to fluid (e.g., watertight) after being substantially filled with the second moderating fluid 159B. After being substantially filled, both the TS chamber 156 and the MSS chamber 158 can prevent fluid communication between the MSS chamber 158 and the TS chamber 156 to keep the first moderating fluid 159A and the second moderating fluid 159B separated and isolated from each another. When the TS chamber 156 and the MSS chamber 158 are being substantially drained, then the TS chamber 156 and the MSS chamber 158 are no longer impermeable to fluid.

Figure 1B:
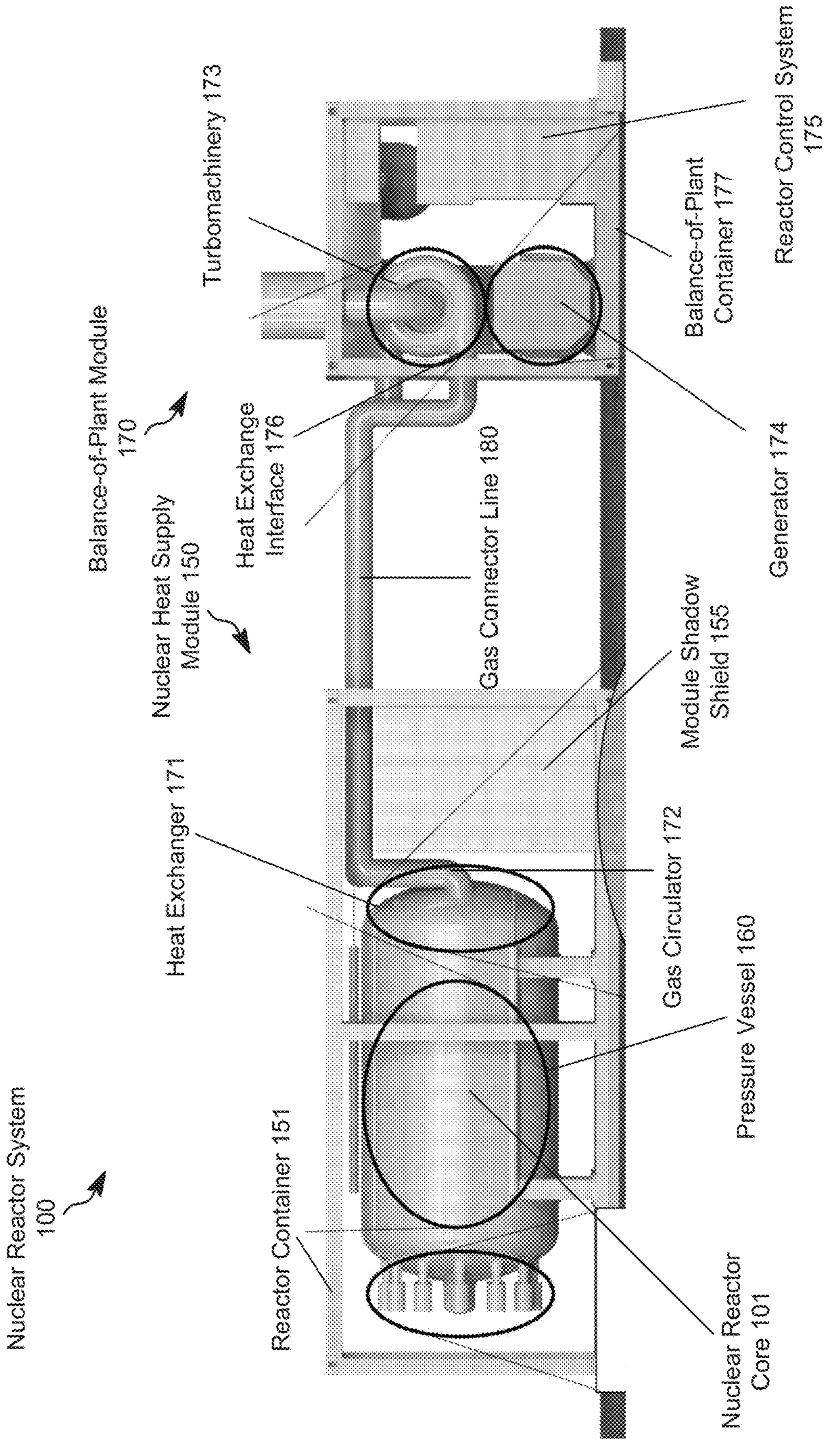
FIG. 1B is an isometric view of the nuclear reactor system of FIG. 1A including both the NHS module of FIG. 1A as well as a balance-of-plant (BOP) module connected to the NHS module.

In some examples, the MSS chamber 158 directly contacts the top, bottom, sides, and front of the reactor container 151, as shown in FIG. 1A. In those examples, the first moderating fluid 159A in the TS chamber 156 cannot flow around the MSS chamber 158, only up to the shared wall between the TS chamber 156 and the MSS chamber 158. In FIG. 1B, however, the MSS chamber 158 is shown with a small gap on all faces between the MSS chamber 158 and the reactor container 151. In those examples, like FIG. 1B, the MSS chamber 158 may technically be inside the TS chamber 156, and the first moderating fluid 159A within the TS chamber 156 may flow around the MSS chamber 158.

Figure 7:
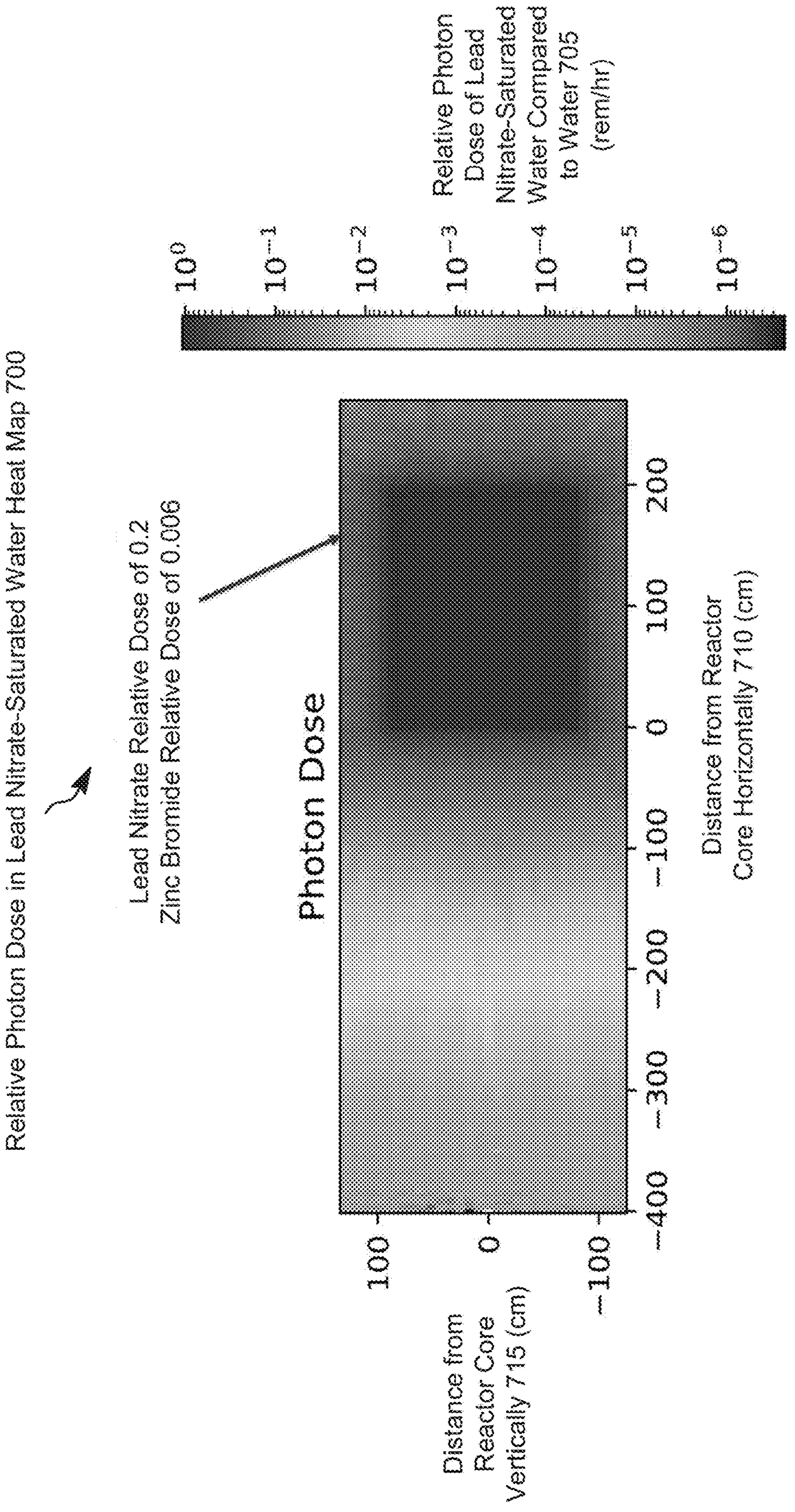
FIG. 7 is a heat map of the photon dose received in different locations of the NHS module when lead nitrate-saturated water is used to fill the transport shield chamber, as compared to when water alone is used to fill the transport shield chamber.
Figure 8:
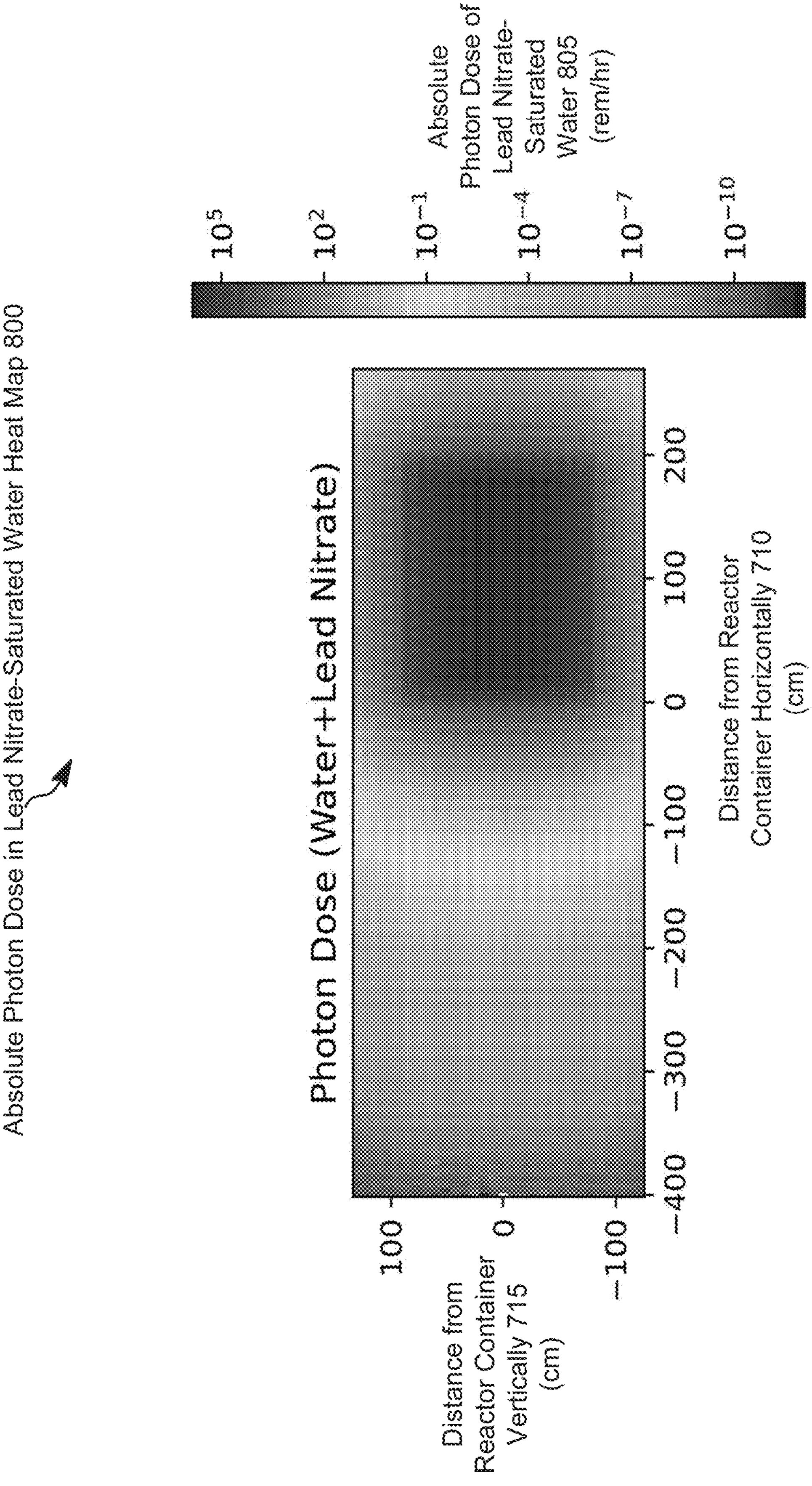
FIG. 8 is a heat map of the photon dose received in different locations of the NHS module when lead nitrate-saturated is used to fill the transport shield chamber.

The TS chamber 156 and MSS chamber 158 are watertight in order to selectively hold moderating fluid 159A-B. Moderating fluids 159A-B are a fluid selected for the ability to moderate neutron flux, slowing down fast neutrons within the TS chamber 156 and MSS chamber 158. Moderating fluids 159A-B in a simple approach are water. The water used as moderating fluids 159A-B does not need to be chemically pure water, and in-situ potable or untreated water can be used as moderating fluids 159A-B. The moderating fluids 159A-B can be water, liquid organic compounds with a high hydrogen content, and can contain additives to enhance neutron and gamma shielding. FIGS. 7-8 discuss improvements over using water, in particular utilizing water saturated with lead nitrate, and utilizing water saturated with zinc bromide. Moderating fluids 159A-B may be the same fluid, i.e., they may both be water saturated with lead nitrate. Alternatively, the first moderating fluid 159A could be a different fluid, such as well water, from the second moderating fluid 159B, which may be water saturated with zinc bromide. The first moderating fluid 159A may be a more available, less efficient moderating fluid like potable water, while the second moderating fluid 159B may be a water saturated with metal, which requires bringing particulate metal on-site to combine with water, or bringing water previously saturated with metal on-site, in exchange for improved moderating efficiency. Different moderating fluids 159A-B have different efficacies as moderators: water works as a good moderating fluid because of a high number of hydrogen and oxygen atoms, which work well to shield against gamma radiation produced during the decay of fission products in the nuclear reactor core 101. Metals added to water either absorb fast neutrons, or direct fast neutrons away from the reactor container 151.

When the TS chamber 156 is at least substantially filled with a first moderating fluid 159A the first moderating fluid 159A in the TS chamber 156 forms a transport shield (TS) 155. The transport shield 155, as it comprises the first moderating fluid 159A, surrounds the nuclear reactor 107 and reduces neutron fluence within the transport shield 155 and outside the transport shield 155. Note that the transport shield 155 and the first moderating fluid 159A do not extend into the nuclear reactor 107. There is no fluid communication between the interior of the nuclear reactor 107 and the TS chamber 156, and the first moderating fluid 159A does not reduce neutron fluence within the nuclear reactor 107.

The purpose of the transport shield 155 is primarily to make the nuclear reactor 107 safe to transport during ground transportation, or when moving through populated areas. The transport shield 155 is used during transportation when living organisms (e.g., people) are going to come into proximity of the nuclear reactor 107 from multiple directions. The transport shield 155 is designed to make a human operator/worker walking around the nuclear reactor 107 safe while the TS chamber 156 is filled with moderating fluid 159A. The first moderating fluid 159A can be a hydrogen dense liquid, which can be removed during operation, added during ground transportation, or when moving through populated areas. The first moderating fluid 159A of the transport shield 155 can then be removed if loaded into an aircraft 502 for air transport and reloaded once back on the ground. Depending upon the implementation, the TS chamber 156 does not necessarily need to be substantially drained of the first moderating fluid 159A in order to activate the nuclear reactor 107. However, as the submerged nuclear reactor 107 is more difficult for technicians to access and maintain in the event of equipment failure, it is preferred that the first moderating fluid 159A not remain in the transport shield 155 indefinitely or during active use.

When the MSS chamber 158 is substantially filled with the second moderating fluid 159B, the second moderating fluid 159B in the MSS chamber 158 forms a module shadow shield 157. The module shadow shield 157 is designed to block fast neutrons travelling in a module shadow shield unprotected arc 191A from the nuclear reactor core 101 which would otherwise pass through the module shadow shield 157 through a module shadow shield protected arc 191B, and serves to shield reactor control system 175 components and the balance-of-plant module (BOP) 170 during operation. The size, shape, and position of the module shadow shield 157 are such that the module shadow shield 157 is designed to protect the BOP module 170 as further discussed in FIG. 1B, and to shield radiation workers while preparing the nuclear reactor 107 for transport. The module shadow shield 157 is placed near the nuclear reactor core 101 to minimize size of the module shadow shield 157 while maximizing the module shadow shield protected arc 191B.

Generally, the module shadow shield 157 is empty during transport of the nuclear reactor 107 and is substantially filled for reactor operation. In-situ materials or materials transported separately are used to fill the module shadow shield 157. For some regimes of operation, the transport shield 155 can be substantially filled during operation to reduce neutron activation of the structure of the nuclear reactor system 100.

Moving to the nuclear reactor 107 itself, the nuclear reactor 107 has a pressure vessel 160. The pressure vessel 160 is discussed below in FIG. 1C. The pressure vessel 160 exterior may be treated with a coating, or forged or manufactured with particular metals or chemicals in order to further reduce corrosion or oxidation experienced by modular reactors submerged in moderating fluids 159A-B (e.g., water or more complex fluids).

The pressure vessel 160 has a pressure vessel interior wall 161, upon which an in-vessel neutron shield 153 is mounted. The in-vessel neutron shield 153 serves the primary purpose of reducing and preventing the activation of the structural materials. The in-vessel neutron shield 153 significantly reduces the need for heavy shielding to shield against the gamma emissions from the activated structural materials. The in-vessel neutron shield 153 can be a composite material or a multi-layered material with neutron moderators (such as metal hydrides, polyethylene, plastics, beryllium-bearing compounds, or a combination thereof) and neutron absorbing materials (such as boron, boron carbide, gadolinium (Gd), europium, tungsten (W), or a combination thereof) enriched in specific isotopes or natural isotopic composition.

The in-vessel neutron shield 153 is on the inside pressure vessel interior wall 161 of the pressure vessel 160, and the in-vessel neutron shield 153 can either be a continuous material or a sum of smaller modular components assembled to coat the inside pressure vessel interior wall 161 of the pressure vessel 160. In-vessel neutron shield 153 be made of medium to high temperature materials, and operate at temperatures above 300 degrees Celsius. The in-vessel neutron shield 153 can have distinct moderating and neutron absorbing layers, and can have the neutron absorbing material, a bulk material, or be further embedded in a high-temperature matrix to increase the operating temperature of the in-vessel neutron shield 153. The in-vessel neutron shield 153 reduces activation of the pressure vessel 160 and the surrounding structures such as the reactor container 151 or the BOP module 170 by reducing the neutron fluence leaving the nuclear reactor core 101. The in-vessel neutron shield 153 can be implemented like the in-vessel shield 105 described in International Application. No. PCT/US2020/054188, filed on Oct. 4, 2020, titled "Integrated In-Vessel Neutron Shield," which published as International Publication No. WO 2021/067901 on Apr. 8, 2021, the entirety of which is incorporated by reference herein.

On the interior of the in-vessel neutron shield 153, between the nuclear reactor core 101 and the MSS chamber 158, is the in-vessel shadow shield 154. The in-vessel shadow shield 154 provides neutron and gamma shielding between the nuclear reactor 107 and the BOP module 170 as well as the reactor control system 175. The in-vessel shadow shield 154 is placed near the active nuclear reactor core 101 to minimize the size of the in-vessel shadow shield 154 while maximizing the in-vessel shadow shield protected arc 190B. The purpose of the in-vessel shadow shield 154 is to shield radiation workers while preparing the nuclear reactor 107 for transport.

The in-vessel shadow shield 154 is made up of heavy metals, and is designed to block fast neutrons and provide shielding from gamma radiation travelling in an in-vessel shadow shield unprotected arc 190A from the nuclear reactor core 101 which would otherwise pass through the in-vessel shadow shield 154 in an in-vessel shadow shield protected arc 190B. The size, shape, and position of the in-vessel shadow shield 154 are such that the in-vessel shadow shield 154 is designed to protect the BOP module 170 further discussed in FIG. 1B. The in-vessel shadow shield 154 is placed near the nuclear reactor core 101, within the pressure vessel 160 to minimize size of the in-vessel shadow shield 154 while maximizing the in-vessel shadow shield protected arc 190B.

The transport shield 155 and the in-vessel neutron shield 153 can be thought of as a pair of analogous shields, and the module shadow shield 157 and the in-vessel shadow shield 154 can be thought of as another pair of analogous shields. The transport shield 155 (when active and filled with the first moderating fluid 159A) and the in-vessel neutron shield 153 fully surround the nuclear reactor core 101, and seek to dampen the fast neutrons leaving the nuclear reactor core 101 in all directions. The module shadow shield 157 (when active and filled with second moderating fluid 159B) and the in-vessel shadow shield 154 are placed at the same end of the nuclear reactor core 101, as close as possible to the nuclear reactor core 101, in order to establish a module shadow shield protected arc 191B and further enhance an in-vessel shadow shield protected arc 190B extending from the nuclear reactor core 101. An "unprotected arc" refers to a three-dimensional space between the nuclear reactor core 101 and the respective shield 154, 157 in which radiation is unblocked by the respective shield 154, 157. A "protected arc" refers to a three-dimensional space whose boundaries are between the respective shield 154, 157 and beyond the respective shield 154, 157 in which radiation is blocked by the respective shield 154, 157. The module shadow shield 157, the in-vessel shadow shield 154, and the BOP module 170 are placed such that the BOP module 170 is within the protected arcs 190A, 191A protected by the module shadow shield 157 and the in-vessel shadow shield 154.

Likewise, the transport shield 155 and the module shadow shield 157 can be thought of as a different type of pair of analogous shields, and the in-vessel neutron shield 153 and the in-vessel shadow shield 154 can be thought of as another pairing of analogous shields. The transport shield 155 and the module shadow shield 157 are selectively activated by filling their respective chambers (TS chamber 156 and MSS chamber 158) with moderating fluid 159A-B. The transport shield 155 and the module shadow shield 157 moderate by virtue of the moderating fluids 159A-B: in this example, the TS chamber 156 and MSS chamber 158 are made of stainless steel, and the TS chamber 156, MSS chamber 158 have marginal moderating effect without the moderating fluids 159A-B. Alternative metals for the TS chamber 156 and MSS chamber 158 include aluminum alloy, carbon-composite, titanium alloy, a radiation resilient SiC composite, nickel based alloys (e.g., Inconel™ or Haynes™), or a combination thereof. Note that in other examples, the TS chamber 156 and MSS chamber 158 can be formed of a solid moderating material. However, the increased weight and thickness of a solid moderating material can result in unacceptable tradeoffs to improve moderating ability of the TS chamber 156 and MSS chamber 158 themselves. The fluid selectivity of the transport shield 155 and the module shadow shield 157 allows the NHS module 150 to shed substantial mass when the TS chamber 156 or MSS chamber 158 are substantially drained of the moderating fluids 159A-B, with the tradeoff of increased radioactivity in areas beyond the TS chamber 156 and MSS chamber 158.

By comparison, the in-vessel neutron shield 153 and the in-vessel shadow shield 154 are permanently active, and are always reducing neutron flux in the areas beyond the nuclear reactor core 101 which pass through the volumes of the in-vessel neutron shield 153 and the in-vessel shadow shield 154. The in-vessel neutron shield 153 and the in-vessel shadow shield 154 are made of metals, not fluid, and cannot be selectively engaged. The mass of the in-vessel neutron shield 153 and the in-vessel shadow shield 154 are always present in the NHS module 150.

FIG. 1B is an isometric view of the nuclear reactor system 100 of FIG. 1A including both the nuclear heat supply (NHS) module 150 as well as a balance-of-plant (BOP) module 170 connected to the NHS module 150. The nuclear reactor system 100 depicted here is in a deployed state, where the NHS module 150 and the BOP module 170 are separated, but connected by a gas connector line 180. The nuclear reactor 107 is also active here: the nuclear reactor core 101 is critical, and the nuclear reactor 107 is optimally generating heat.

Separating the BOP module 170 from the NHS module 150 reduces the radiation exposure of the BOP module 170 and a human operator of the BOP module 170 in two ways. First, the increased distance allows fast neutrons to slow down or be absorbed as they escape the reactor container 151 and head toward the BOP module 170. Second, the in-vessel shadow shield 154 and the module shadow shield 157 moderate fast neutrons travelling in unprotected arcs 190B, 191B from the nuclear reactor core 101. As the distance from the in-vessel shadow shield 154 and the module shadow shield 157 to the BOP module 170 increases relative to the fixed distance from the in-vessel shadow shield 154 and the module shadow shield 157 to the nuclear reactor core 101, the protected arcs 190A, 191A protected by the in-vessel shadow shield 154 and the module shadow shield 157 become larger, and protect more of the BOP module 170 as well as the human operator standing nearby the BOP module 170.

The pressure vessel 160 of the nuclear reactor 107 is shown to also contain a heat exchanger 171, which exchanges heat from the nuclear reactor core 101 from one medium to another medium (e.g., gas, liquid, solid, or a combination thereof). The heat exchanger 171 in this example also acts as the in-vessel shadow shield 154, but these two components can be discrete, and the heat exchanger 171 does not need to be on the same side or portion of the pressure vessel 160 as the in-vessel shadow shield 154.

The gas (e.g., He) heated by the heat exchanger 171 is circulated by the gas circulator 172 of the NHS module 150 down the gas connector line 180 toward the BOP module 170. Once the BOP module 170 has utilized the hot gas and thereby cooled the gas, the gas circulator 172 circulates the gas through the remainder of the gas connector line 180 back to the heat exchanger 171, to be reheated by the heat exchanger 171 and recirculated. This recirculation occurs as long as the nuclear reactor 107 is active, and the BOP module 170 is configured to accept hot gas.

The BOP module 170 is also in BOP container 177, which is a shipping container in the style of a CONEX or ISO box or capsule similar to the reactor container 151. The BOP container 177 is also designed to be transported by any means conventional to a shipping container in the style of a CONEX or ISO box, like the reactor container 151. However, in this example, because the BOP module 170 requires less space, the BOP container 177 is only 10 feet long. Meaning, when this example nuclear reactor system 100 is in a packaged state, and the NHS module 150 and the BOP module 170 are packaged together, the nuclear reactor system 100 is thirty feet long: twenty feet of NHS module 150, and ten feet of BOP module 170.

The BOP module 170 is configured to transform the heat in hot gas from the gas connector line 180 into synchronous electricity. The BOP module 170 achieves this as follows: turbomachinery 173 has a heat exchange interface 176, and intakes the hot gas. The hot gas enters a compressor turbine in the turbomachinery 173, and the compressor turbine produces mechanical work output via a shaft of the turbomachinery 173. That shaft of the turbomachinery 173 is directly or indirectly controlled via gears or belts coupled to a generator 174. The generator 174 converts the mechanical work output of the turbomachinery 173 into synchronous alternating current electrical output. That electrical output of the generator 174 is the electrical output for which the nuclear reactor system 100 is operated.

The nuclear reactor 107 and internal components such as control rods 115A-N, heat exchanger 171, gas circulator 172, turbomachinery 173, and generator 174 are controlled by a reactor control system 175 with instrumentation. In this example the reactor control system 175 is housed within the BOP container 177, however in other example the reactor control system 175 can be removed and operated remotely from the BOP container 177.

Figure 1C:
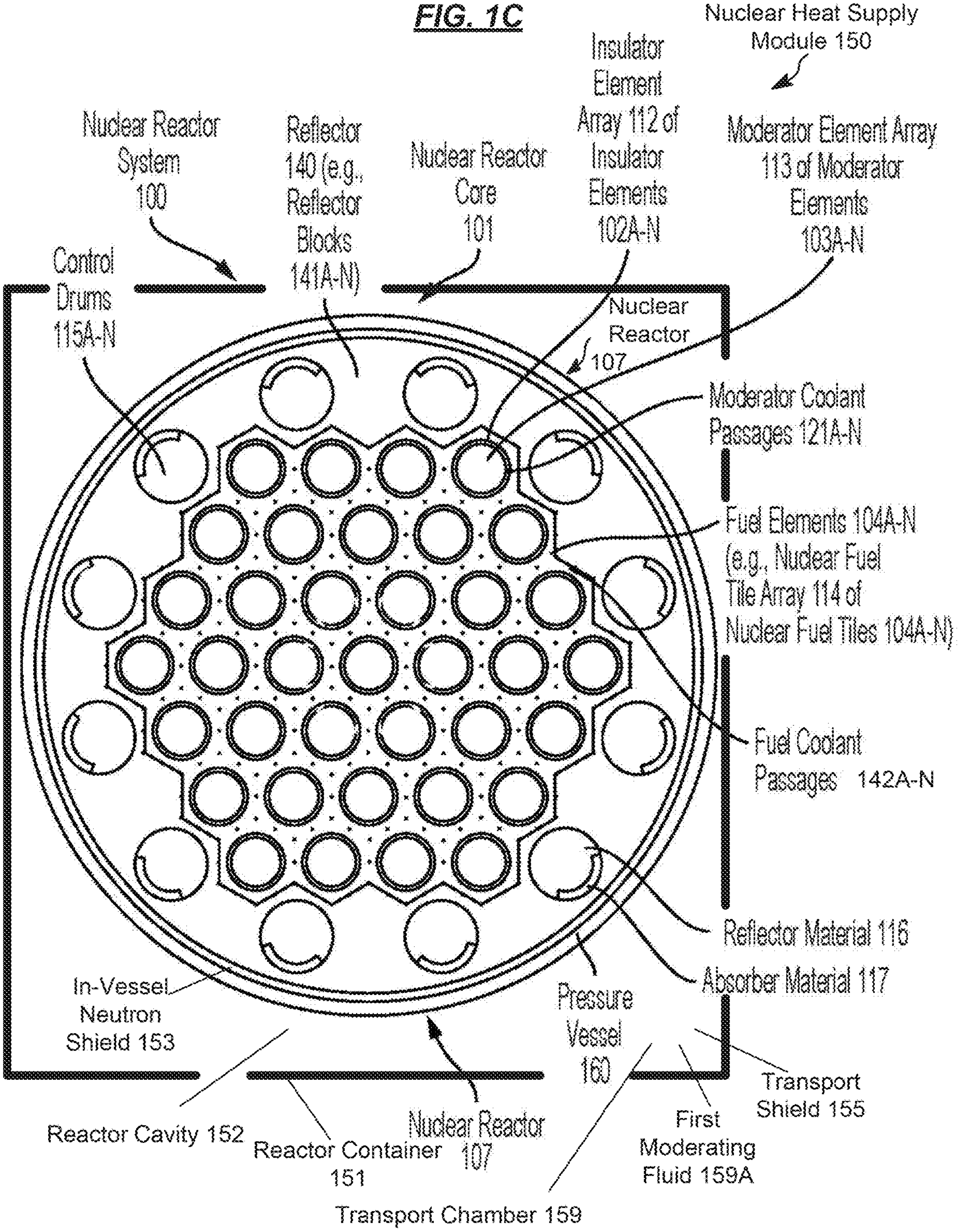
FIG. 1C is a cross-sectional view of the nuclear heat supply module showing a nuclear reactor core, the in-vessel neutron shield, the transport shield, and a reactor container.

FIG. 1C is a cross-sectional view of the NHS module 150, showing a nuclear reactor core 101, in-vessel neutron shield 153, and transport shield 155. Also shown are the outline of the reactor container 151 and components that comprise the nuclear reactor 107. As previously stated, the nuclear reactor system 100 includes a pressure vessel 160 and a nuclear reactor core 101 disposed in the pressure vessel 160. The pressure vessel 160 is surrounded by the transport shield 155 that includes the first moderating fluid 159A substantially filing the TS chamber 156. The TS chamber 156 is itself within the reactor cavity 152 of the reactor container 151.

The nuclear reactor core 101 includes a plurality of fuel elements 104A-N and at least one moderator element 103A. The fuel element 104A emits free neutrons, and is designed to generate heat energy within the nuclear reactor core 101 of the nuclear reactor system 100. In the example of FIG. 1C, a moderator element 103A is paired with the fuel element 104A, and is designed to slow down fast neutrons while still allowing the nuclear reactor core 101 to produce heat energy. Nuclear reactor system 100 further includes a plurality of control drums 115A-N disposed longitudinally within the pressure vessel 160 and laterally surrounding the plurality of fuel elements 104A-N and the at least one moderator element 103A to control reactivity of the nuclear reactor core 101. Each of the control drums 115A-N includes a reflector material 116 on a first portion 166 of an outer surface 165 and an absorber material 117 on a second portion 167 of the outer surface 165. Burnable poison can be integrated within the plurality of fuel elements 104A-N and the at least one moderator element 103A to shut down the nuclear reactor core 101 in an emergency.

Control drums 115A-N regulate the neutron population in the nuclear reactor core 101 and nuclear reactor 107 power level like control rods in other nuclear reactor systems. To increase or decrease neutron flux in the nuclear reactor core 101, the control drums 115A-N are rotated; whereas control rods are inserted or removed from the nuclear reactor core 101. Because the control drums 115A-N are rotated to adjust reactivity of the nuclear reactor core 101, instead of being inserted and removed, the control drums 115A-N have a permanently fixed longitudinal position: the control drums 115A-N do not move in or out of the nuclear reactor core 101 or pressure vessel 160. There are risks that control rods may not insert fully into the nuclear reactor core 101 due to misalignment or blockages in a control rod hole, and utilizing control drums 115A-N advantageously reduces those risks. Control rods nevertheless could be utilized: in this example the heads of the control drums 115A-N as shown in FIGS. 1A-B are away from the module shadow shield 157.

As shown in FIG. 1C, a first portion of an outer surface of the control drum 115A includes a reflector material 116, which is generally formed of a material with a high elastic scattering neutron cross section. When the reflector material 116 faces inwards towards the nuclear reactor core 101, the neutron flux increases, which increases the reactivity and operating temperature of the nuclear reactor core 101. A second portion of the outer surface of the control drum 115A includes an absorber material 117, which can be formed of a neutron poison. Neutron poisons are isotopes or molecules with a high absorption neutron cross section particularly suited to absorbing free neutrons. When the absorber material 117 faces inwards towards the nuclear reactor core 101, the neutron flux decreases, which decreases the reactivity and operating temperature of the nuclear reactor core 101.

Nuclear reactor system 100 can selectively rotate the control drum 115A or a plurality of control drums 115A-N to face either the absorber material 117 towards the nuclear reactor core 101, decreasing neutron flux and operating temperature; or the reflector material 116 towards the nuclear reactor core 101, increasing neutron flux and operating temperature. Therefore, the nuclear reactor system 100 can selectively increase or decrease neutron flux of the nuclear reactor core 101. To rapidly decrease neutron flux and achieve a decreased flux state, the nuclear reactor system 100 can rotate the control drum 115A to maximally expose the absorber material 117 of the control drum 115A to the fuel elements 104A-N of the nuclear reactor core 101, thereby absorbing more free neutrons and decreasing neutron flux. To rapidly increase neutron flux and achieve an increased flux state, the nuclear reactor system 100 can rotate the control drum 115A to maximally expose the reflector material 116 of the control drum 115A to the fuel elements 104A-N of the nuclear reactor core 101, thereby reflecting more free neutrons and increasing neutron flux. To make an intermediate adjustment or sustain a continuous level of neutron flux, the nuclear reactor core 101 can rotate the control drum 115A to a partial exposure of the absorber material 117 of the control drum 115A to the fuel elements 104A-N of nuclear reactor core 101.

Partial or full exposure of the reflector material 116 can move the nuclear reactor 107 to a critical state, and a sustained critical state will induce an active state. When the nuclear reactor 107 is in an active state, the nuclear reactor 107 is producing an optimal amount of heat and therefore electricity via the BOP module 170, as well as a high level of free neutrons that may escape the nuclear reactor core 101. In this example, the nuclear reactor 107 takes approximately three days to reach a fully active state from an inactive state.

Partial or full exposure of the absorber material 117, or the materially complete consumption of the fuel elements 104A-N, will move the nuclear reactor 107 to a sub-critical state; a sustained sub-critical state will induce an inactive state. When the nuclear reactor 107 is in an inactive state, the nuclear reactor 107 is producing a minimal amount of heat, and very likely no electricity via the BOP module 170, should the BOP module 170 be coupled to an inactive NHS module 150. The nuclear reactor 107 in the inactive state is also producing a minimal amount of free neutrons that may escape the nuclear reactor core 101. In this example, the nuclear reactor 107 takes approximately seven days to reach a fully inactive state from an active state.

Once the nuclear reactor 107 and therefore the NHS module 150 reach an inactive state, and the transport shield 155 is deployed due to the TS chamber 156 being filled with moderator fluid 159A, the NHS module 150 is ready for transport.

The plurality of fuel elements 104A-N in the nuclear reactor core 101 are arranged as a nuclear fuel tile array 114 of nuclear fuel tiles 104A-N. The nuclear reactor core 101 includes a plurality of moderator elements 103A-N. Such an implementation of the nuclear reactor core 101 is described in International Application No. PCT/US2020/054190, filed on Oct. 4, 2020, titled "Nuclear Reactor Core Architecture with Enhanced Heat Transfer and Safety," which published as International Publication No. WO 2021/067903 on Apr. 8, 2021, the entirety of which is incorporated by reference herein. In a second example, the nuclear reactor core 101 can be implemented like the nuclear reactor core described in FIGS. 3-4 and the associated text of U.S. Pat. No. 10,643,754 to Ultra Safe Nuclear Corporation of Seattle, Washington, issued May 5, 2020, titled "Passive Reactivity Control of Nuclear Thermal Propulsion Reactors" the entirety of which is incorporated by reference herein. In the second example, the fuel elements 104A-N can be implemented like the fuel elements 310A-N, and the moderator elements 103A-N can be implemented like the tie tubes 320A-N described in FIGS. 3-4 and the associated text of U.S. Pat. No. 10,643,754.

In a third example, the nuclear reactor core 101 can be implemented like the nuclear reactor core 101 described in FIG. 2C and the associated text of U.S. Patent Pub. No. 2020/0027587 to Ultra Safe Nuclear Corporation of Seattle, Washington, published Jan. 23, 2020, titled "Composite Moderator for Nuclear Reactor Systems," the entirety of which is incorporated by reference herein. In the third example, the fuel elements 104A-N can be implemented like the fuel elements 102A-N and the moderator elements 103A-N can be implemented like the composite moderator blocks described in FIG. 2C and the associated text of U.S. Patent Pub. No. 2020/0027587.

The nuclear reactor 107 includes a reflector 140 (e.g., an outer reflector region) located inside the pressure vessel 160. Reflector 140 includes a plurality of reflector blocks 141A-N laterally surrounding the plurality of fuel elements 104A-N and the at least one moderator element 103A.

Nuclear reactor 107 includes the nuclear reactor core 101, in which a controlled nuclear chain reaction occurs, and energy is released. The neutron chain reaction in the nuclear reactor core 101 is critical—a single neutron from each fission nucleus results in fission of another nucleus—the chain reaction must be controlled. By sustaining controlled nuclear fission, the nuclear reactor system 100 produces heat energy. In an example implementation, the nuclear reactor system 100 is implemented as a gas-cooled high temperature nuclear reactor 107. However, the nuclear reactor system 100 can be implemented as a heat pipe nuclear reactor, molten-salt-cooled nuclear reactor, helium-cooled nuclear reactor, graphite moderated nuclear reactor, fuel-in-salt nuclear reactor, a supercritical CO2 reactor, an (open or closed) Brayton cycle reactor, or a sodium-cooled fast nuclear reactor. In particular, the nuclear reactor system 100 can be implemented with a gas-cooled graphite-moderated nuclear reactor, a fluoride salt-cooled high-temperature nuclear reactor with a higher thermal neutron flux than the gas-cooled graphite-moderated nuclear reactor, or a sodium fast nuclear reactor with a faster neutron flux than the gas-cooled graphite-moderated nuclear reactor.

Each of the fuel elements 104A-N, shown as nuclear fuel tiles 104A-N, includes a nuclear fuel. The nuclear fuel includes a fuel compact comprised of coated fuel particles, such as tristructural-isotropic (TRISO) fuel particles embedded inside a high-temperature matrix. In some implementations, the nuclear fuel includes a fuel compact comprised of bistructural-isotropic (BISO) fuel particles embedded inside the high-temperature matrix. In yet another implementation, the nuclear fuel includes a fuel compact comprised of a variation of TRISO known as TRIZO fuel particles. A TRIZO fuel particle replaces the silicon carbide layers of the TRISO fuel particle with zirconium carbide (ZrC). Alternatively, the TRIZO fuel particle includes the typical coatings of a TRISO fuel particle and an additional thin ZrC layer coating around the fuel kernel, which is then surrounded by the typical coatings of the TRISO fuel particle. The high-temperature matrix includes silicon carbide, zirconium carbide, titanium carbide, niobium carbide, tungsten, molybdenum, or a combination thereof. Each of the TRISO fuel particles can include a fuel kernel surrounded by a porous carbon buffer layer, an inner pyrolytic carbon layer, a binary carbide layer (e.g., ceramic layer of SiC or a refractory metal carbide layer), and an outer pyrolytic carbon layer. The refractory metal carbide layer of the TRISO fuel particles can include at least one of titanium carbide (TiC), zirconium carbide (ZrC), niobium carbide (NbC), tantalum carbide, hafnium carbide, ZrC—$ZrB_2$ composite, ZrC—$ZrB_2$—SiC composite, or a combination thereof. The high-temperature matrix can be formed of the same material as the binary carbide layer of the TRISO fuel particles.

The nuclear fuel retains fission products within itself, reducing the immediate need to dispose of nuclear waste products. The coated fuel particles also reduce proliferation risk as compared to commercial light water reactor fuel.

A description of TRISO fuel particles dispersed in a silicon carbide matrix to form a cylindrical shaped nuclear fuel compact is provided in the following patents and publications of Ultra Safe Nuclear Corporation of Seattle, Washington: U.S. Pat. No. 9,299,464, issued Mar. 29, 2016, titled "Fully Ceramic Nuclear fuel and Related Methods"; U.S. Pat. No. 10,032,528, issued Jul. 24, 2018, titled "Fully Ceramic Micro-encapsulated (FCM) fuel for CANDUs and Other Reactors"; U.S. Pat. No. 10,109,378, issued Oct. 23, 2018, titled "Method for Fabrication of Fully Ceramic Microencapsulation Nuclear Fuel"; U.S. Pat. No. 9,620,248, issued Apr. 11, 2017 and U.S. Pat. No. 10,475,543, issued Nov. 12, 2019, titled "Dispersion Ceramic Micro-encapsulated (DCM) Nuclear Fuel and Related Methods"; U.S. Patent Pub. No. 2020/0027587, published Jan. 23, 2020, titled "Composite Moderator for Nuclear Reactor Systems"; and U.S. Pat. No. 10,573,416, issued Feb. 25, 2020, titled "Nuclear Fuel Particle Having a Pressure Vessel Comprising Layers of Pyrolytic Graphite and Silicon Carbide," the entireties of which are incorporated by reference herein. As described in those Ultra Safe Nuclear Corporation patents, the nuclear fuel can include a cylindrical fuel compact or pellet comprised of TRISO fuel particles embedded inside a silicon carbide matrix to create a cylindrical shaped nuclear fuel compact. A description of TRISO, BISO, or TRIZO fuel particles dispersed in a zirconium carbide matrix to form a cylindrical shaped nuclear fuel compact is provided in U.S. Patent Pub. No. 2021/0005335 to Ultra Safe Nuclear Corporation of Seattle, Washington, published Jan. 7, 2021, titled "Processing Ultra High Temperature Zirconium Carbide Microencapsulated Nuclear Fuel," the entirety of which is incorporated by reference herein.

As shown, nuclear reactor core 101 includes an insulator element array 112 of insulator elements 102A-N and a moderator element array 113 of moderator elements 103A-N. Insulator elements 102A-N are formed of a high-temperature thermal insulator material with low thermal conductivity. The high-temperature thermal insulator material can include low density carbides, metal-carbides, metal-oxides, or a combination thereof. More specifically, the high-temperature thermal insulator material includes low density SiC, stabilized zirconium oxide, aluminum oxide, low density ZrC, low density carbon, or a combination thereof. Moderator elements 103A-N are formed of a low-temperature solid-phase moderator. The low-temperature solid-phase moderator can include $MgH_x$, $YH_x$, $ZrH_x$, $CaH_x$, $ZrO_x$, $CaO_x$, $BeO_x$, $BeC_x$, Be, enriched boron carbide, $^{11}B_4C$, $CeH_x$, $LiH_x$, or a combination thereof.

In this nuclear reactor system 100, the nuclear reactor 107 can include a plurality of control drums 115A-N and a reflector 140. The control drums 115A-N may laterally surround the insulator element array 112 of insulator elements 102A-N, the moderator element array 113 of moderator elements 103A-N, and nuclear fuel tile array 114 of nuclear fuel tiles 104A-N to change reactivity of the nuclear reactor core 101 by rotating the control drums 115A-N. As depicted, the control drums 115A-N reside on the perimeter or periphery of a pressure vessel 160 and are positioned circumferentially around the insulator elements 102A-N, moderator elements 103A-N, and nuclear fuel tiles 104A-N of the nuclear reactor core 101. Control drums 115A-N may be located in an area of the reflector 140, e.g., an outer reflector region formed of reflector blocks 141A-N immediately surrounding the nuclear reactor core 101, to selectively regulate the neutron population and reactor power level during operation. For example, the control drums 115A-N can be a cylindrical shape and formed of both a reflector material 116 (e.g., beryllium (Be), beryllium oxide (BeO), BeSiC, BeMgO, $Al_2O_3$, etc.) on a first portion of an outer surface 165 and an absorber material 117 on a second portion of the outer surface (e.g., outer circumference).

The reflector material 116 and the absorber material 117 can be on opposing sides of the cylindrical shape, e.g., portions of an outer circumference, of the control drums 115A-N. The reflector material 116 can include a reflector substrate shaped as a cylinder or a truncated portion thereof. The absorber material 117 can include an absorber plate or an absorber coating. The absorber plate or the absorber coating are disposed on the reflector substrate to form the cylindrical shape of each of the control drums 115A-N. For example, the absorber plate or the absorber coating covers the reflector substrate formed of the reflector material 116 to form the control drums 115A-N. When the reflector material 116 is the truncated portion of the cylinder, the absorber material 117 is a complimentary body shape to the truncated portion to form the cylindrical shape.

Control drums 115A-N can be formed of a continuous surface, e.g., rounded, aspherical, or spherical surfaces to form a cylinder or other conical surfaces to form a quadric surface, such as a hyperboloid, cone, ellipsoid, paraboloid, etc. Alternatively or additionally, the control drums 115A-N can be formed of a plurality of discontinuous surfaces (e.g., to form a cuboid or other polyhedron, such as a hexagonal prism). As used herein, "discontinuous" means that the surfaces in aggregate do not form a continuous outer surface 165 that is round (e.g., circular or oval) perimeter of the control drums 115A-N. In FIG. 1C, the outer surface shown is a rounded continuous surface.

Rotating the depicted cylindrical-shaped control drums 115A-N changes proximity of the absorber material 117 (e.g., boron carbide, $B_4C$) of the control drums 115A-N to the nuclear reactor core 101 to alter the amount of neutron reflection. When the reflector material 116 is inwards facing towards the nuclear reactor core 101 and the absorber material 117 is outwards facing, neutrons are scattered back (reflected) into the nuclear reactor core 101 to cause more fissions and increase reactivity of the nuclear reactor core 101. When the absorber material 117 is inwards facing towards the nuclear reactor core 101 and the reflector material 116 is outwards facing, neutrons are absorbed and further fissions are stopped to decrease reactivity of the nuclear reactor core 101.

Neutron reflector 140, e.g., shown as the outer reflector region, can be filler elements disposed between outermost nuclear fuel tiles 104A-N and the control drums 115A-N as well as around the control drums 115A-N. Reflector 140 can be formed of a moderator that is disposed between the outermost nuclear fuel tiles 104A-N and an optional barrel (e.g., formed of beryllium). The reflector 140 can include hexagonal or partially hexagonal shaped filler elements and can be formed of a neutron moderator (e.g., beryllium oxide, BeO). Although not required, nuclear reactor 107 can include the optional barrel (not shown) to surround the bundled collection that includes the insulator element array 112, moderator element array 113, nuclear fuel tile array 114 of the nuclear reactor core 101, as well as the reflector 140. As depicted, the control drums 115A-N reside on the perimeter of the pressure vessel 160 and can be interspersed or disposed within the reflector 140, e.g., surround a subset of the filler elements (e.g., reflector blocks 141A-N) forming the reflector 140.

Pressure vessel 160 can be formed of aluminum alloy, carbon-composite, titanium alloy, a radiation resilient SiC composite, nickel based alloys (e.g., Inconel™ or Haynes™), or a combination thereof. Pressure vessel 160 and nuclear reactor system 100 can be comprised of other components, including cylinders, piping, and storage tanks that transfer a moderator coolant that flows through moderator coolant passages 121A-N; and a separate nuclear fuel coolant, such as a propellant (e.g., hydrogen gas or liquid) that flows through the fuel coolant passages 142A-N.

The moderator coolant and the nuclear fuel coolant can be a gas or a liquid that are not in fluid communication with the moderating fluids 159A-B.

In the example of FIG. 1C, nuclear reactor system 100 enables the moderator coolant to flow through the moderator coolant passages 121A-N and a separate nuclear fuel coolant to flow through the fuel coolant passages 142A-N. The moderator coolant passages 121A-N are flattened ring shaped (e.g., O-shape) openings, such as a channels or holes to allow the moderator coolant to pass through in the nuclear reactor core 101 and into a heat sink (not shown) via a dedicated moderator coolant loop, for example. The fuel coolant passages 142A-N are channels or holes to allow the nuclear fuel coolant to pass through in the nuclear reactor core 101 and into or near the heat exchanger 171 in order to heat the gas for the BOP module 170.

In an alternative implementation, a coolant that is shared between the moderator elements 103A-N and the nuclear fuel tiles 104A-N may be flowed through both the moderator coolant passages 121A-N and the fuel coolant passages 141A-N. In the alternative implementation, the coolant that flows through the plurality of fuel elements 104A-N can include helium, FLiBe molten salt formed of lithium fluoride (LiF), beryllium fluoride ($BeF_2$), sodium, He, HeXe, $CO_2$, neon, or HeN. The shared coolant flows through the moderator coolant passages 121A-N before the shared coolant is heated in the nuclear fuel tiles 104A-N. This keeps the moderator elements 103A-N cool.

Figure 1D:
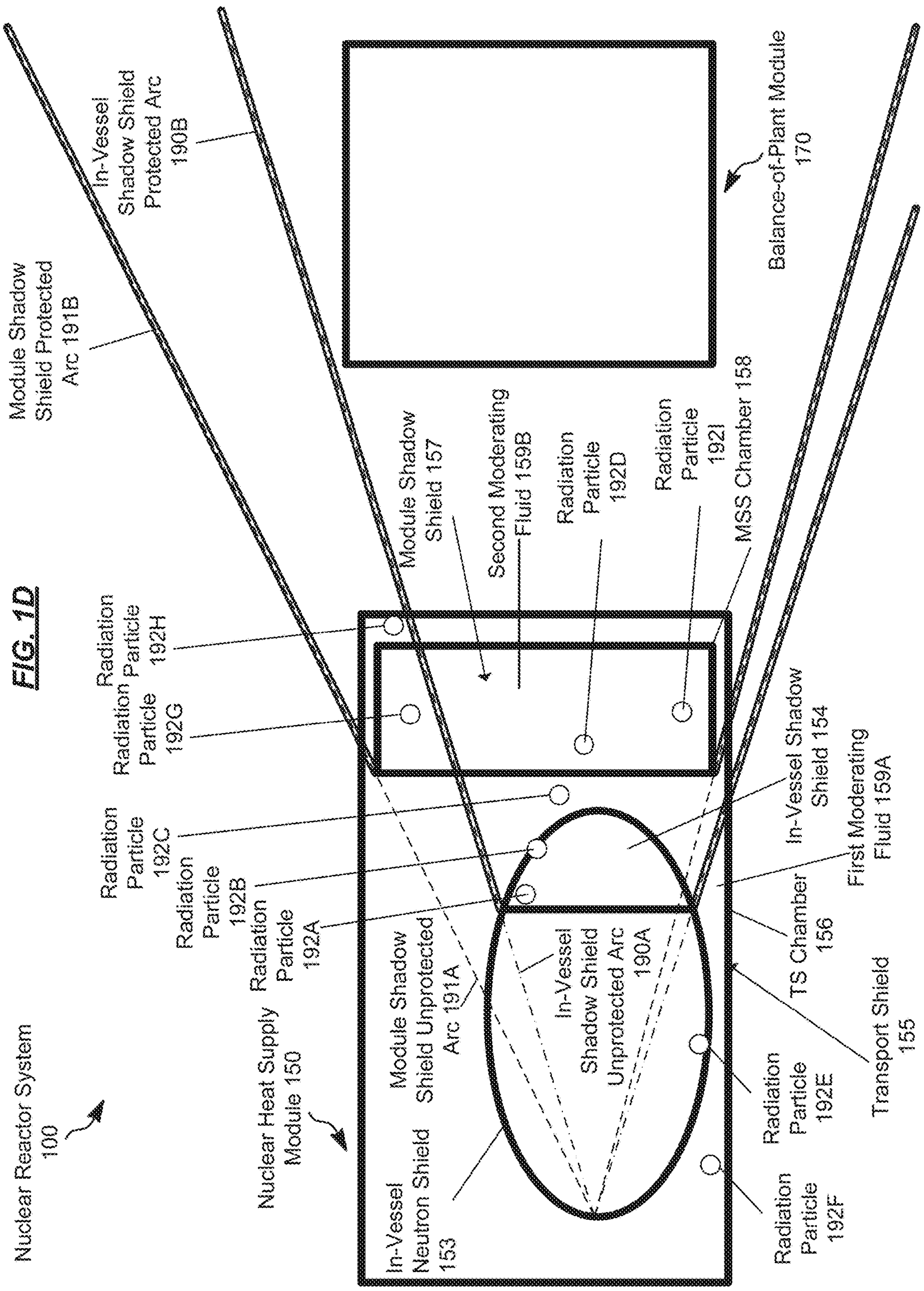
FIG. 1D illustrates an in-vessel shadow shield protected arc, a module shadow shield protected arc, and a plurality of radiation particles and paths when emitted by the nuclear reactor core.

FIG. 1D illustrates an in-vessel shadow shield unprotected arc 190A, an in-vessel shadow shield protected arc 190B, a module shadow shield unprotected arc 191A, a module shadow shield protected arc 191B, and a plurality of radiation particles 192A-I and paths when emitted by the nuclear reactor core 101. The in-vessel shadow shield protected arc 190B established by the in-vessel shadow shield 154 and the module shadow shield protected arc 191B established by the module shadow shield 157 may not completely overlap. Therefore, individual radiation particles 192A-I emanating from the nuclear reactor core 101 can be blocked along a variety of routes. The in-vessel neutron shield 153, in-vessel shadow shield 154, transport shield 155, and module shadow shield 157 can block a variety of radiation particles, notably alpha, beta, and gamma particles. However, due to their ability to travel through moderators with ease as compared to other radioactive particles, and due to the risk to equipment and human life they present, the in-vessel neutron shield 153, in-vessel shadow shield 154, transport shield 155, and module shadow shield 157 can be preferably designed to block gamma particles.

A first radiation particle 192A can strike the in-vessel shadow shield 154 and is blocked. A second radiation particle 192B can pass through the in-vessel shadow shield 154, strike the in-vessel neutron shield 153, and is blocked. A third radiation particle 192C can pass through the in-vessel shadow shield 154 and in-vessel neutron shield 153, strike the transport shield 155, and is blocked. A fourth radiation particle 192D can pass through the in-vessel shadow shield 154, the in-vessel neutron shield 153, and the transport shield 155, strike the module shadow shield 157, and is blocked.

A fifth radiation particle 192E can strike the in-vessel neutron shield 153 directly and stop. A sixth neutron particle 192F can pass through the in-vessel neutron shield 153 and strike the transport shield 155 and is blocked. A seventh radiation particle 192G can pass through the in-vessel neutron shield 153 and the transport shield 155, strike the module shadow shield 157, and is blocked. In an example where the TS chamber 156 surrounds the MSS chamber 158, an eighth radiation particle 192H can pass through the in-vessel neutron shield 153, the transport shield 155 for a first time, and the module shadow shield 157, strike the transport shield 155 for a second time, and is blocked. In another example where the TS chamber 156 surrounds the MSS chamber 158, a ninth radiation particle 192I can pass through the in-vessel shadow shield 154, the in-vessel neutron shield 153, the transport shield 155 for a first time, the module shadow shield 157, strike the transport shield 155 for a second time, and is blocked.

Therefore, FIGS. 1A-D depict a nuclear reactor system 100 that includes a nuclear heat supply (NHS) module 150. The NHS module includes a reactor container 151. The reactor container 151 includes a reactor cavity 152. The NHS module 150 further includes a pressure vessel 160 within the reactor container 151. The pressure vessel 160 includes an interior wall 161. The NHS module 150 further includes a nuclear reactor core 101 located within the pressure vessel 160. The nuclear reactor core 101 includes a plurality of fuel elements 104A-N and at least one moderator element 103A. The NHS module 150 further includes an in-vessel neutron shield 153 located on the interior wall 161 of the pressure vessel 160 to surround the nuclear reactor core 101. The NHS module 150 further includes an in-vessel shadow shield 154 inside the pressure vessel 160. The NHS module 150 further includes a transport shield (TS) 155 within the reactor container 151 and outside the pressure vessel 160 that includes a TS chamber 156 within the reactor cavity 152 for containing a first moderating fluid 159A. The NHS module 150 further includes a module shadow shield (MSS) 157 within the reactor container 151 and outside the pressure vessel 160 that includes an MSS chamber 158 within the reactor cavity 152 for containing a second moderating fluid 159B.

The transport shield 155 further includes the first moderating fluid 159A substantially filling the TS chamber 156. The module shadow shield 157 further includes the second moderating fluid 159B substantially filling the MSS chamber 158. The NHS module 150 further includes an intermediate heat exchanger 171 and a gas circulator 172. The heat exchanger 171 is thermally coupled to the nuclear reactor core 101. The transport shield 155 further includes the first moderating fluid 159A. The first moderating fluid 159A substantially fills the TS chamber 156.

The NHS module 150 includes an active and an inactive state. In a first example, a roentgen equivalent man (rem) dose outside the NHS module 150 induced by the NHS module 150 while the NHS module 150 is in the inactive state is less than 50 rem per hour (rem/hr). The first moderating fluid includes water ($H_2O$). In a second example, a rem dose outside the NHS module 150 induced by the NHS module 150 while the NHS module 150 is in the inactive state is less than 10 rem per hour (rem/hr). The first moderating fluid 159A includes water ($H_2O$), and the first moderating fluid 159A contains a concentration of $Pb(NO_3)_2$ (lead nitrate) of approximately 1.63 grams per cubic centimeter (g/cc) or greater. In a third example, a rem dose outside the NHS module 150 induced by the NHS module 150 while the NHS module 150 is in the inactive state is less than 0.5 rem per hour (rem/hr). The first moderating fluid 159A includes water ($H_2O$), and the first moderating fluid 159A contains a concentration of $ZnBr_2$ (zinc bromide) of approximately 5 grams per cubic centimeter (g/cc) or greater.

The module shadow shield 157 further includes the second moderating fluid 159B. The second moderating fluid 159B substantially fills the MSS chamber 158. The plurality of fuel elements 104A-N emit a plurality of radiation particles 192A-I. The in-vessel shadow shield 154 initially blocks a first radiation particle 192A of the plurality of radiation particles 192A-I. The in-vessel neutron shield 153 blocks a second radiation particle 192B of the plurality of radiation particles 192A-I that passes through the in-vessel shadow shield 154. The transport shield 155 blocks a third radiation particle 192C of the plurality of radiation particles 192A-I that passes through the in-vessel shadow shield 154 and the in-vessel neutron shield 153. The module shadow shield 157 blocks a fourth radiation particle 192D of the plurality of radiation particles 192A-I that passes through the in-vessel shadow shield 154, the in-vessel neutron shield 153, and the transport shield 155.

The nuclear reactor system 100 further includes a balance-of-plant (BOP) module 170 disposed outside the NHS module 150. The reactor container 151 houses the transport shield 155, the module shadow shield 157, the pressure vessel 160, the in-vessel shadow shield 154, the nuclear reactor core 101, and the in-vessel neutron shield 153. The BOP module 170 includes turbomachinery 173, a generator

174, and a reactor control system 175. The first moderating fluid 159A blocks a radiation particle 192C (e.g., by absorbing the radiation particle 192C) to prevent the radiation particle 192C from traveling to the BOP module 170. The second moderating fluid 159B blocks a radiation particle 192D (e.g., by absorbing the radiation particle 192D) to prevent the radiation particle 192D from traveling to the BOP module 170.

The in-vessel shadow shield 154, the in-vessel neutron shield 153, the first moderating fluid 159A, and the second moderating fluid 159B include one or more neutron absorbing materials. The in-vessel neutron shield 153 is formed of a composite material or a multi-layered material with a neutron moderator and a neutron absorbing material enriched in specific isotopes or natural isotopic composition. The first moderating fluid 159A includes a hydrogen-dense liquid. The second moderating fluid 159B includes water ($H_2O$). The neutron moderator includes metal hydrides, polyethylene, plastics, beryllium bearing compounds, or a combination thereof. The neutron absorbing material includes boron, boron carbide, metal boride, gadolinium, europium, tungsten, or a combination thereof. The in-vessel neutron shield 153 is formed of two or more neutron absorbing materials. The two or more neutron absorbing materials include a near black neutron absorbing material and a gray absorbing material.

Figure 2:
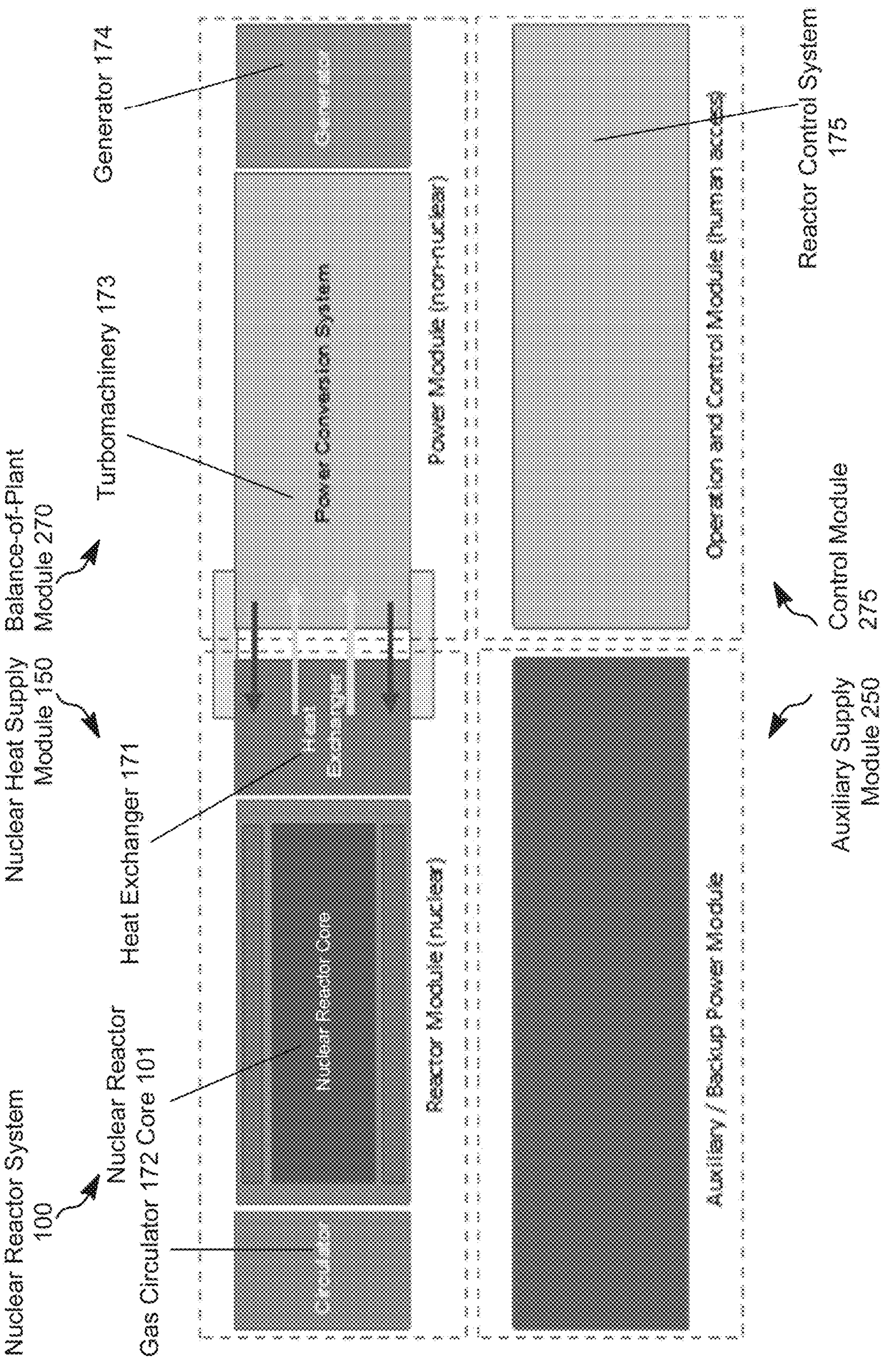
FIG. 2 is a block diagram of the nuclear reactor system of FIG. 1B, but further including an auxiliary supply module and a discrete control module.

FIG. 2 is a block diagram of the nuclear reactor system 100 of FIG. 1B, but further including an auxiliary supply module 250 and a discrete control module 275. The NHS module 150 is the same as in FIGS. 1A-D, with a nuclear reactor core 101 generating heat, exchanged into a heat exchanger 171, then circulated by the gas circulator 172 to the BOP module 170. The BOP module 270 is similar to the BOP module 170 in FIGS. 1A-D, but the reactor control system 175 is implemented in a separated control module 270. The BOP module 270 still accepts heat from the NHS module 150, uses turbomachinery 173 in a power conversion system to convert hot gas energy into mechanical rotational energy, which turns a generator 174, generating synchronous alternating current electricity. This NHS module 150 is a helium-cooled nuclear reactor 107 coupled through a heat exchanger 171 to a secondary loop for power conversion.

The nuclear reactor system 100 includes an auxiliary supply module 250. This auxiliary supply module 250 runs when the NHS module 150 is in the inactive state. This auxiliary supply module 250 can be powered by petrochemicals, can be a large battery, or can use alternative energy sources. The auxiliary supply module 250 can also be designed to absorb the residual heat from the nuclear reactor core 101. The auxiliary supply module 250 may use this residual heat to generate electricity, mechanical energy, or even hot gas like the NHS module 150. Or the auxiliary supply module 250 may simply assist in bleeding off heat or free neutrons from the NHS module 150, more quickly moving the NHS module 150 from the active state to the inactive state when desired.

Further, the nuclear reactor system 100 includes the control module 275 discussed above. The control module 275 incorporates the reactor control system 175 directed to controlling the NHS module and the BOP module. Additionally, the control module 275 can control the auxiliary supply module 250.

Figure 3A:
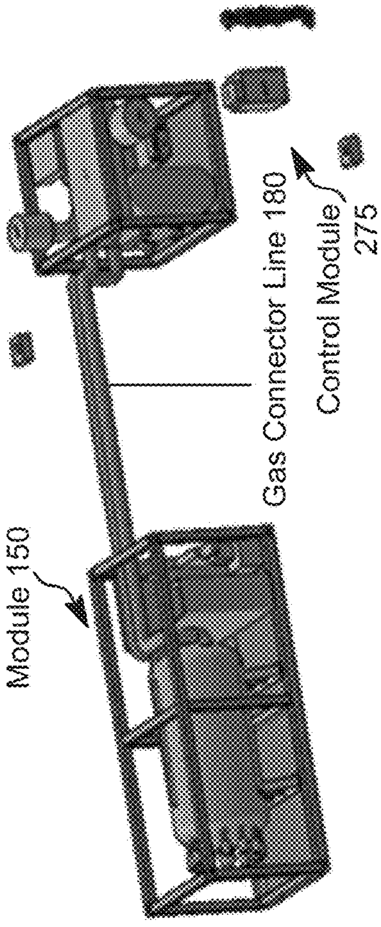
FIG. 3A is an isometric view the nuclear reactor system of FIG. 1B in a deployed state, with the BOP module at a distance from the NHS module.

FIG. 3A is an isometric view of the nuclear reactor system 100 of FIG. 1B in a deployed state, with the BOP module 270 at a distance from the NHS module 150. In this deployed state, personnel can more safely interact with the BOP module 270 due to the increased distance from the NHS module 150. Heated gas can still move from the NHS module 150 to the BOP module 270 via the gas connector line 180. The depictions of the nuclear reactor system 100 in the deployed state all depict the NHS module 150 and the BOP module 170, 270 as oriented as axially horizontal, e.g., flat or flush to the ground. These axially horizontal orientations can improve logistics and deployment, and minimize seismic concerns. However, the NHS module 150 can be oriented in any direction, and can even be buried at or below grade. Being partially or completely buried below grade can reduce the rem dose experienced by near the NHS module 150, and may reduce shielding requirements or safety requirements for those personnel. Burying should be understood as burying in earth, cementing in concrete, as well as sinking into water. The NHS module 150 can also be placed in a building, at, above, or below grade. Placing the NHS module 150 up very high, or below grade in a basement, can also reduce shielding requirements or safety requirements for personnel. The NHS module 150 can also be at any reasonable distance from the BOP module 170, 270, though a longer gas connector line 180 will likely result in more heat loss as the gas circulator 172 sends heated gas from the NHS module 150 to the BOP module 170, 270.

Figure 3B:
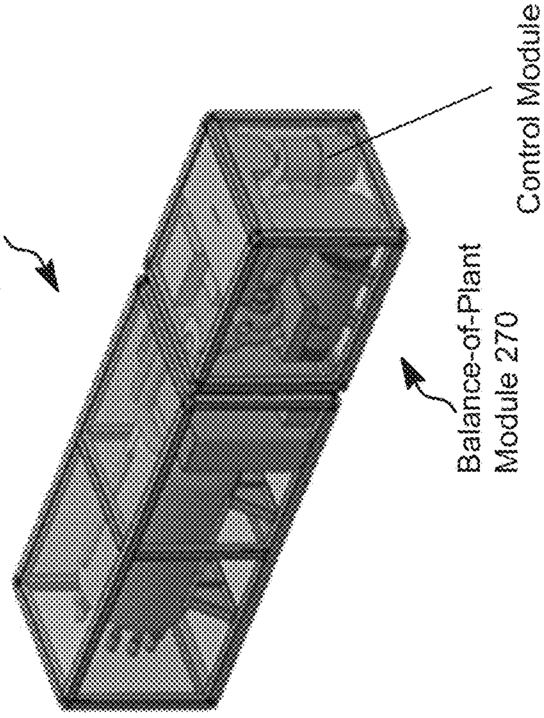
FIG. 3B is an isometric view of the nuclear reactor system of FIG. 1B in a packaged state, with the BOP module in close proximity to the NHS module.

FIG. 3B is an isometric view of the nuclear reactor system of FIG. 1B in a packaged state, with the BOP module 270 in close proximity to the NHS module 150. The control module 275 is packed in with the BOP module 270, in the BOP container 177. In this packaged state, the nuclear reactor system 100 is easy to transport, fitting on a single semi-trailer truck trailer. The nuclear reactor system 100 can be operated in this configuration; however, this may place excess radiation on the BOP module 270 and personnel operating the nuclear reactor system 100. For example, if the in-vessel shadow shield protected arc 190B and the module shadow shield protected arc 191B do not fully cover the BOP module 270 and the immediate area around the BOP module where personnel would stand.

Figure 4:
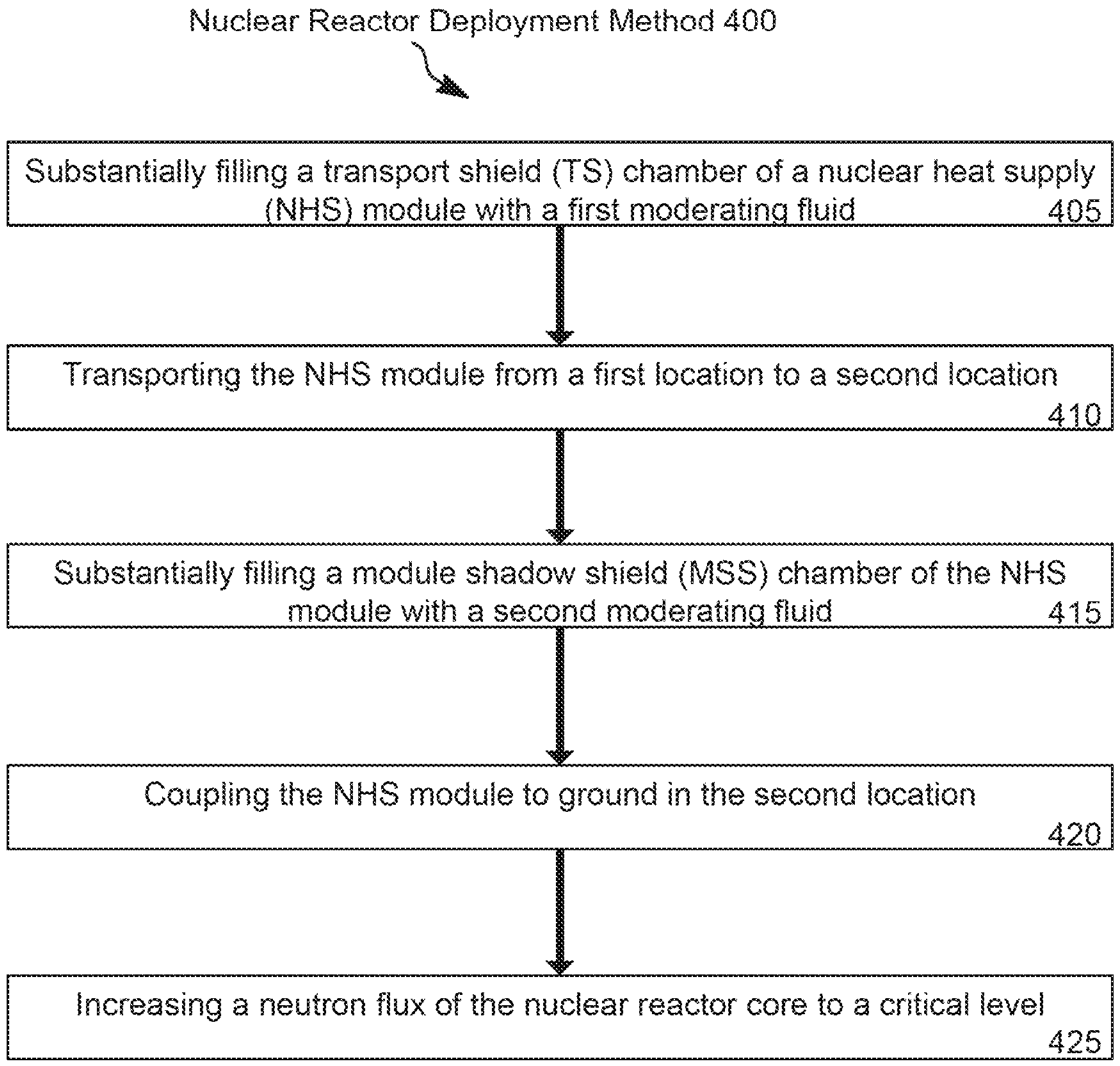
FIG. 4 is a flowchart of a nuclear reactor deployment method.

FIG. 4 is a flowchart of a nuclear reactor deployment method 400 for a nuclear reactor system 100. Steps 405, 410, 415, 420, and 425 of the nuclear reactor deployment method 400 can be performed in any order, but the order presented is likely most safe for living organisms or plant personnel in close enough proximity to components of the nuclear reactor system 100 where radiation exposure is a concern. The order of steps establishes the broadest shield (the transport shield 155) first, then the specific shield (the MSS 157), before having plant personnel work closely near the nuclear reactor 107 to mount the NHS module 150.

Beginning in step 405, the nuclear reactor deployment method 400 includes substantially filling a transport shield (TS) chamber 156 of a nuclear heat supply (NETS) module 150 with a first moderating fluid 159A. The NETS module 150 includes a nuclear reactor core 101. Moving to step 410, the nuclear reactor deployment method 400 further includes transporting the NETS module 150 from a first location to a second location.

Continuing now to step 415, the nuclear reactor deployment method 400 further includes after transporting the NETS module, substantially filling a module shadow shield (MSS) chamber 158 of the NETS module 150 with a second moderating fluid 159B. In step 420, the nuclear reactor deployment method 400 further includes coupling the NETS module 150 to ground in the second location. Coupling the NETS module 150 to the ground can mean affixing the NETS module 150 to the ground, a structure or platform, or partially or fully burying the NETS module 150 in the ground, below grade. Affixing the NETS module 150 to an object that is itself directly or indirectly affixed or coupled to the ground affixes and couples the NETS module 150 to the ground. Finishing in step 425, the nuclear reactor deployment method 400 further includes increasing a neutron flux of the nuclear reactor core 101 to a critical level, ultimately generating enough heat for the balance-of-plant module 170 to generate electricity. Typically, the step 425 of increasing the neutron flux of the nuclear reactor core 101 to the critical level occurs after the step of substantially filling the MSS chamber 158 with the second moderating fluid 159B.

Figure 5A:
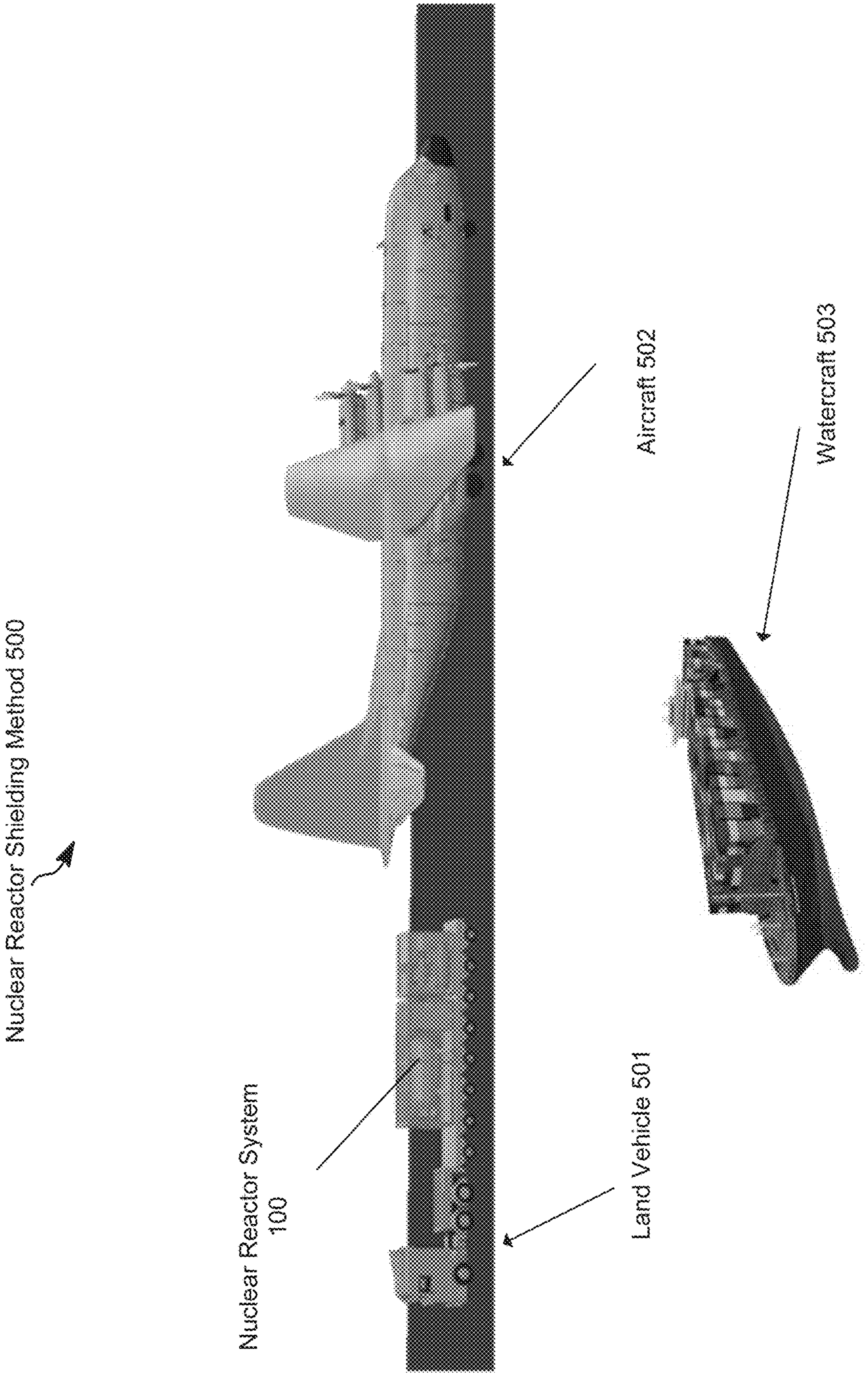
FIG. 5A is a schematic of steps of a nuclear reactor shielding method in which the nuclear reactor system is in a packaged state, loaded on a land vehicle, and prepared to load into an aircraft.

FIG. 5A is a schematic of steps of a nuclear reactor shielding method 500 in which the nuclear reactor system 100 is in a packaged state, loaded on a land vehicle 501, and prepared to load into an aircraft 502, or possibly a watercraft 503. As discussed previously, the nuclear reactor system 100 when packaged can fit on a semi-trailer truck trailer. When on a land vehicle 501, the nuclear reactor system 100 is in the inactive state, and the transport shield 155 is filled with the first moderating fluid 159A and moderating.

The nuclear reactor system 100 can also fit within an aircraft 502, such as the Lockheed Hercules™ C-100 or C130™. However, in order to meet size and weight requirements of certain aircraft 502 (and some land vehicle(s) 501), the NHS module 150 and BOP module 170 may need to be separated and transported separately. Then, upon completing their respective journeys, the NHS module 150 and the BOP module 170 can be rejoined, either in a packaged state to continue their journey, or in a deployed state to begin providing power. As the nuclear reactor system 100 can fit within the volume of, and has the safety tolerances of a shipping container in the style of a CONEX or ISO box, the nuclear reactor system 100 can also be accommodated by a watercraft 503, like a container ship.

Figure 5B:
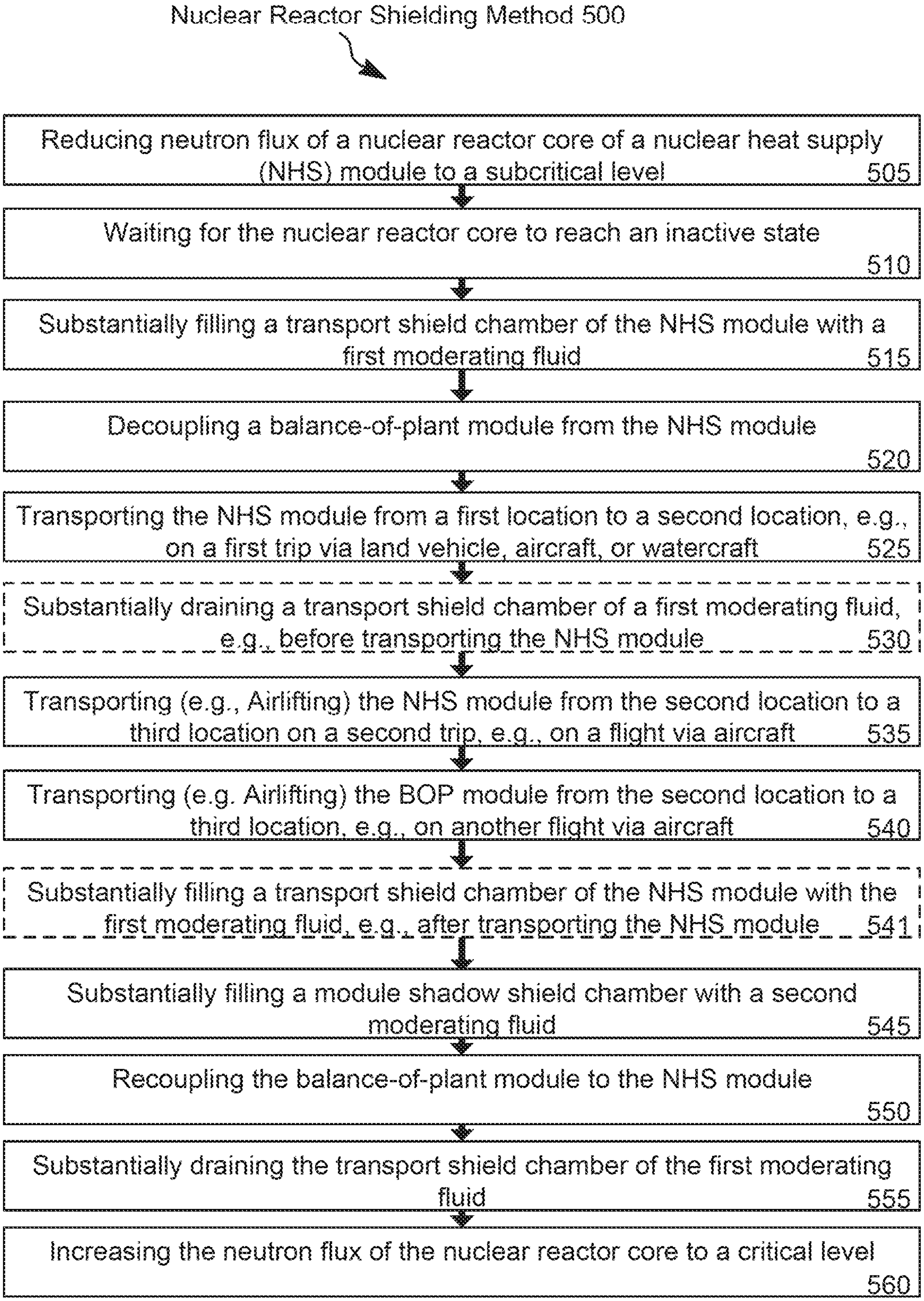
FIG. 5B is a flowchart of the nuclear reactor shielding method to mitigate the risk of living organisms being exposed to radiation.

FIG. 5B is a flowchart of the nuclear reactor shielding method 500 to mitigate the risk of living organisms being exposed to radiation. The steps of the nuclear reactor shielding method 500 can be performed in any order, but the order presented is likely most safe for living organisms or plant personnel in close enough proximity to components of the nuclear reactor system 100 where radiation exposure is a concern. Broadly, this nuclear reactor shielding method 500 covers a nuclear reactor system 100 going inactive, travelling by truck, then plane, then truck again, and going active. Beginning in step 505, the nuclear reactor shielding method 500 includes before transporting a nuclear heat supply (NETS) module 150, reducing a neutron flux of a nuclear reactor core 101 of the NETS module 150 to a subcritical level. Next, in step 510, the nuclear reactor shielding method 500 includes after reducing the neutron flux of the nuclear reactor core to the subcritical level, waiting for the nuclear reactor core 101 to reach an inactive state. In this example, the inactive state is reached within seven days. Step 510 can be skipped, but the NHS module 150 when transported will emit substantially more radiation and more preventative measures will need to be taken. Next in step 515, or at the same time as steps 505 and 510, the nuclear reactor shielding method 500 includes substantially filling a transport shield (TS) chamber 156 of the nuclear heat supply (NETS) module 150 of a nuclear reactor system 100 with a first moderating fluid 159A. As noted above, the nuclear reactor system 100 includes the nuclear reactor core 101.

Moving to step 520, if the weight of the BOP module 170 causes the nuclear reactor system 100 to exceed the weight capacity limit of the land vehicle 501, aircraft 502, or watercraft 503, or for safety or efficient logistics reasons, the nuclear reactor shielding method 500 can include after reducing the neutron flux of the nuclear reactor core 101 to a subcritical level, decoupling a balance-of-plant (BOP) module 170 from the NETS module 150. In step 520, assume that, for example, due to weight capacity issues of the land vehicle 501, the BOP module 170 needs to be separated from the NETS module 150. Alternatively, step 520 can occur before airlifting the NETS module 150 from the second location to a third location on a second trip, but after step 525.

Continuing to step 525, the nuclear reactor shielding method 500 includes transporting the NETS module 150 from a first location to a second location. The step 525 of transporting the NETS module 150 from the first location to the second location can include transporting the NETS module 150 from the first location to the second location on a first trip via land vehicle 501, aircraft 502, or watercraft 503. For example, the NETS module 150 and/or the balance-of-plant (BOP) module 170 can be loaded onto a land vehicle 501, aircraft 502, or watercraft 503, and transported from a first location to a second location on a first trip. Before step 525, the nuclear reactor system 100 is placed in a packaged state, unless the BOP module 170 is being transported separately from the NETS module 150. In examples where the nuclear reactor system 100 only takes a single trip over land or sea, step 545 can be skipped to. In examples where the nuclear reactor system 100 only takes a single trip over land or sea, and the BOP module 170 is transported with the NETS module 150, step 545 can be skipped to, and step 550 can be omitted.

Continuing now to optional step 530, if the weight of the first moderating fluid 159A causes the nuclear reactor system 100 to exceed the weight capacity limit of a second aircraft, the nuclear reactor shielding method 500 can include substantially draining the TS chamber 156 of the first moderating fluid 159A before transporting (e.g., airlifting) the NHS module 150. Step 530 is optional and if weight capacity is not an issue, the first moderating fluid 159A is not substantially drained from the TS chamber 156. Step 520 preferably occurs before step 530 because the transport shield 155 will protect personnel decoupling the NHS module 150 from the BOP module 170.

In step 535, the nuclear reactor shielding method 500 includes transporting the NHS module 150 from the second location to a third location on a second trip. Typically, before airlifting the NHS module 150 from the second location to the third location on the flight, the nuclear reactor shielding method 500 implements step 520 of decoupling the balance-of-plant module 170 from the NHS module 150. For example, step 535 can include airlifting the NHS module 150 from the second location to the third location on a second trip e.g., on a flight via aircraft 502. Either using a second aircraft (with a potentially lower weight capacity than the first aircraft, vehicle 501 or watercraft 503), or the same aircraft 502 before or after step 535, step 540 of the nuclear reactor shielding method 500 can include transporting (e.g. airlifting) the BOP module 170 from the second location to the third location, for example, on another flight via aircraft 502. Once the NHS module 150 flight lands, step 545 can occur, but optional step 541 occurs if optional step 530 occurred.

In optional step 541, the nuclear reactor shielding method 500 includes substantially filling the TS chamber with the first moderating fluid 159A, e.g., after transporting (e.g., airlifting) the NHS module 150. Step 541 is optional and may only occur if step 530 occurs. This second substantial filling of the first moderating fluid 159A can be literally the same fluid, transported on another flight, or a chemically equivalent fluid. A different fluid can also be used, so long as that fluid also has strong neutron moderating properties like the first moderating fluid 159A.

The NHS module 150 can wait for the BOP module 170 to land at the third location. Once the NHS module 150 reaches the third location, step 545 occurs. In step 545, the nuclear reactor shielding method 500 includes after transporting the NHS module 150, substantially filling a module shadow shield (MSS) chamber 158 of a module shadow shield 157 with a second moderating fluid 159B.

Moving now to step 550, the nuclear reactor shielding method 500 includes after transporting the NHS module 150, and before increasing the neutron flux of the nuclear reactor core 101 to the critical level, recoupling the balance-of-plant module 170 to the NHS module 150. For example, step 550 can include after airlifting the balance-of-plant module 170 from the second location to the third location, recoupling the balance-of-plant module 170 to the NHS module 150. Note that this step only occurs if the BOP module 170 was decoupled from the NHS module 150 in step 520. At this point, the nuclear reactor system 100 is then placed in the deployed state. With a deployed NHS module 150, in step 555, the nuclear reactor shielding method 500 includes substantially draining the TS chamber 156 of the first moderating fluid 159A. Finishing now in step 560, the nuclear reactor shielding method 500 includes after substantially filling the MSS chamber 158 with the second moderating fluid 159B, increasing the neutron flux of the nuclear reactor core 101 to a critical level. Soon after, the nuclear reactor core 101 will enter a critical state, and the BOP module 170 can produce electricity.

In some circumstances, steps can be skipped or performed out of order. In particular, the final draining of the TS chamber 156 in step 555 may be omitted. The MSS chamber 158 may be filled before taking the nuclear reactor system 100 on a trip in a land vehicle 501 or watercraft 503, in order to protect crew who may be seated near the NHS module 150 for extended periods of time. Likewise, if weight limits allow, the MSS chamber 158 may be filled when the TS chamber 156 is drained to take a flight, in order to protect the aircraft crew who may be seated near the NHS module 150 for extended periods of time. Alternatively, the TS chamber 156 may be sectioned into separate sections that will allow only parts of the liquid moderator 159A-B to remain during air transport to stay within weight limits and shield aircraft crew.

FIG. 6 is a table of weights 600 containing a projected or estimated weight of various components of the nuclear reactor system 100. The table of weights 600 is important because a semi-trailer truck is generally only rated to transport 80,000 lbs., a C-130 only rated to transport 42,000 lbs., and a C-100 only rated to transport 51,050 lbs. Looking at the table of weights 600 it can be seen that the total nuclear reactor system mass 615 is projected to be 60,088 lbs. Meaning, the nuclear reactor system 100 can fit on a single semi-trailer truck trailer rated for 80,000 lbs., but is too heavy for even the C-100. However, the NHS module subtotal 605, which is the weight of the NHS module 150, is 44,217 lbs. and can be accommodated on a C-100. To fit within a C-130, the 7,714 lbs. of shielding (i.e., transport shield 155 and module shadow shield 157) in the form of moderating fluids 159A-B, can be partially or fully drained. Once 2,217 lbs. or more of shielding 155, 157 in the form of moderating fluids 159A-B are drained, the NHS module 150 can be transported by the C-130, as the NHS module 150 would then weigh 42,000 lbs. The minimum weight of the NHS module 150, with all of the shielding 155, 157 in the form of moderating fluids 159A-B drained, is 36,503 lbs.

The BOP module subtotal 610, which is the weight of the BOP module 170, indicates that the BOP module should fit in a C-130 or C-100, with room to spare. Some of the drained moderating fluids 159A-B can potentially be paired with the BOP module 170, and the moderating fluids 159A-B could be packaged with the BOP module 170 in a C-100 flight. This packaged moderating fluids 159A-B could then be pumped back into the NHS module 150 upon arrival.

FIG. 7 is a relative photon dose in lead nitrate-saturated water heat map 700 of the photon dose received in different locations in the NHS module 150 when lead nitrate-saturated water is used to fill the TS chamber 156 as a moderating fluid 159A, as compared to when water alone is used to fill the TS chamber 156 as a moderating fluid. Lead nitrate ($Pb(NO_3)_2$) is a good dopant for use with water, as lead nitrate is completely soluble in water. Lead nitrate effectively increases the density of water by about 50%, and adds a high Z material to water. Lead nitrate does not add a new material as an activation concern. A good moderating fluid 159A-B will include a high-Z material, and will not be an activation concern. The solubility of lead nitrate in water ranges from 376 grams per liter (g/l) at 0 degrees Celsius, to 1270 g/l at 100 degrees Celsius. FIGS. 6 and 7 assume a solubility of 1000 g/l, which results in a lead nitrate density in water of 1.63 g/cc. Zinc Bromide ($ZnBr_2$) is another common dopant that allows for higher dopant density, at the expense being of a lower Z-material. In a warm reactor, a zinc bromide density in water of 5 g/cc is achievable.

In FIG. 7, the relative photon dose in lead nitrate-saturated water heat map 700 is representative of a nuclear reactor 107 which has been active for four years, and then taken subcritical and inactive for seven days, allowing for seven days of decay. The dose plane, which is the exterior of the nuclear reactor core, is at (0,0). The units of distance from reactor core vertically 715 are in centimeters, and the units of distance from reactor core horizontally 710 are also in centimeters. It can be seen at (0,0), and in the area bounded by (0, 100), (200, 100), (200, −100), and (0, −100) that there is no improvement in the relative photon dose of lead nitrate saturated water compared to water 705. This is because the box constitutes the nuclear reactor core 101 itself. Moving left, it can be seen that the relative photon dose of lead nitrate saturated water compared to water 705 decreases, ultimately to around $10^{-5}$ at 400 centimeters to the left. Additionally, at the top, it can be seen that at around (100, 125) the relative photon dose of lead nitrate saturated water compared to water 705 is 0.2, or the lead nitrate water dose is one fifth of the dose of water. If zinc bromide were to be used instead, the zinc bromide-saturated water relative dose as compared to water would be 0.0006, or the water dose is 1,667 times larger than the zinc bromide-saturated water dose at that distance.

FIG. 8 is an absolute photon dose in lead nitrate-saturated water heat map 800 of the photon dose received in different locations in the NHS module 150 when lead nitrate-saturated is used to fill the transport shield chamber 156. In FIG. 8, the actual photon dose experienced when the transport shield chamber 156 is filled with water is shown. At (−50,0), approximately where the exterior surface of the reactor container 151 would be, the lead nitrate-saturated water reduced the photon dose by a factor of 5 to around 10 rem/hr. By using zinc bromide at 5 g/cc the photon dose can be reduced by an additional factor of 20, resulting in a 0.5 rem/hr dose at the exterior surface of the reactor container 151.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," "has," "having," "containing," "contain", "contains," "with," "formed of," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

What is claimed is:

1. A nuclear reactor system, comprising:

a nuclear heat supply (NHS) module configured to be transportable, the nuclear heat supply module including:

a reactor container that includes a reactor cavity;

a pressure vessel within the reactor container in a proximal location of the reactor container, wherein the pressure vessel includes an interior wall;

a nuclear reactor core located within the pressure vessel, wherein the nuclear reactor core includes a plurality of fuel elements and at least one moderator element;

an in-vessel neutron shield located on the interior wall of the pressure vessel to surround the nuclear reactor core;

an in-vessel shadow shield inside the pressure vessel;

a transport shield (TS) within the reactor container and outside the pressure vessel that includes a TS chamber within the reactor cavity, wherein the TS chamber is configured to contain a first moderating fluid during transport of the NHS module; and a module shadow shield (MSS) within the reactor container and outside the pressure vessel that includes an MSS chamber within the reactor cavity for containing a second moderating fluid, wherein the module shadow shield is laterally offset from the pressure vessel and in a distal location of the reactor container; and a balance-of-plant module in a shipping container that is separate from the reactor container and configured to be transportable.

2. The nuclear reactor system of claim 1, wherein:

the transport shield further includes the first moderating fluid substantially filling the TS chamber; and the module shadow shield further includes the second moderating fluid substantially filling the MSS chamber.

3. The nuclear reactor system of claim 1, wherein:

the NHS module further includes an intermediate heat exchanger and a gas circulator; and the heat exchanger is thermally coupled to the nuclear reactor core.

4. The nuclear reactor system of claim 1, wherein:

the first moderating fluid substantially fills the TS chamber.

5. The nuclear reactor system of claim 4, wherein:

the NHS module includes an active state and an inactive state;

a roentgen equivalent man (rem) dose outside the NHS module induced by the NHS module while the NHS module is in the inactive state is less than 50 rem per hour (rem/hr); and the first moderating fluid includes water ($H_2O$).

6. The nuclear reactor system of claim 4, wherein:

the NHS module includes an active state and an inactive state;

a roentgen equivalent man (rem) dose outside the NHS module induced by the NHS module while the NHS module is in the inactive state is less than 10 rem per hour (rem/hr); and the first moderating fluid includes water ($H_2O$), and the first moderating fluid contains a concentration of $Pb(NO_3)_2$ of approximately 1.63 grams per cubic centimeter (g/cc) or greater.

7. The nuclear reactor system of claim 4, wherein:

the NHS module has an active state and an inactive state;

a roentgen equivalent man (rem) dose outside the NHS module induced by the NHS module while the NHS module is in the inactive state is less than 0.5 rem per hour (rem/hr); and the first moderating fluid includes water ($H_2O$), and the first moderating fluid contains a concentration of $ZnBr_2$ of approximately 5 grams per cubic centimeter (g/cc) or greater.

8. The nuclear reactor system of claim 1, wherein:
the module shadow shield further includes the second moderating fluid; and
the second moderating fluid substantially fills the MSS chamber.

9. The nuclear reactor system of claim 1, wherein:
the plurality of fuel elements emit a plurality of radiation particles;
the in-vessel shadow shield blocks a first radiation particle of the plurality of radiation particles.

10. The nuclear reactor system of claim 9, wherein:
the in-vessel neutron shield blocks a second radiation particle of the plurality of radiation particles that passes through the in-vessel shadow shield.

11. The nuclear reactor system of claim 9, wherein:
the transport shield blocks a third radiation particle of the plurality of radiation particles that passes through the in-vessel shadow shield and the in-vessel neutron shield.

12. The nuclear reactor system of claim 9, wherein:
the module shadow shield blocks a fourth radiation particle of the plurality of radiation particles that passes through the in-vessel shadow shield, the in-vessel neutron shield, and the transport shield.

13. The nuclear reactor system of claim 1, wherein:
the reactor container houses the transport shield, the module shadow shield, the pressure vessel, the in-vessel shadow shield, the nuclear reactor core, and the in-vessel neutron shield;
the balance-of-plant module includes turbomachinery, a generator, and a reactor control system.

14. The nuclear reactor system of claim 1, wherein:
the first moderating fluid blocks a radiation particle to prevent the radiation particle from traveling to the balance-of-plant module.

15. The nuclear reactor system of claim 1, wherein:
the second moderating fluid blocks a radiation particle to prevent the radiation particle from traveling to the balance-of-plant module.

16. The nuclear reactor system of claim 1, wherein:
at least one of the in-vessel shadow shield, the in-vessel neutron shield, the first moderating fluid, and the second moderating fluid includes one or more neutron absorbing materials.

17. The nuclear reactor system of claim 1, wherein:
the in-vessel neutron shield is formed of a composite material or a multi-layered material; and
the second moderating fluid includes water ($H_2O$).

18. The nuclear reactor system of claim 1, wherein:
the in-vessel neutron shield is formed of a neutron moderator and a neutron absorbing material; and
the neutron moderator includes metal hydrides, polyethylene, plastics, beryllium bearing compounds, or a combination thereof.

19. The nuclear reactor system of claim 1, wherein:
the in-vessel neutron shield is formed of a neutron moderator and a neutron absorbing material; and
the neutron absorbing material includes boron, boron carbide, metal boride, gadolinium, europium, tungsten, or a combination thereof.

20. The nuclear reactor system of claim 1, wherein:
the in-vessel neutron shield is formed of two or more neutron absorbing materials.

21. The nuclear reactor system of claim 1, wherein the shipping container includes a CONEX box or an ISO box.

22. The nuclear reactor system of claim 1, wherein the reactor container includes a CONEX box or an ISO box.

23. The nuclear reactor system of claim 1, wherein the reactor container is shaped as a right rectangular prism or a capsule.

24. The nuclear reactor system of claim 1, wherein the first moderating fluid includes lead nitrate or zinc bromide.

25. The nuclear reactor system of claim 1, wherein the second moderating fluid includes lead nitrate or zinc bromide.

26. The nuclear reactor system of claim 1, wherein the module shadow shield is configured to be substantially filled with the second moderating fluid during operation of the nuclear reactor core to shield the balance-of-plant module.

27. The nuclear reactor system of claim 1, wherein the module shadow shield is configured to be substantially drained during transport of the NHS module.

28. The nuclear reactor system of claim 1, further comprising a plurality of control drums or a plurality of control rods.

29. The nuclear reactor system of claim 1, wherein the nuclear reactor core further includes a reflector located inside the pressure vessel that includes a plurality of reflector blocks laterally surrounding the plurality of fuel elements and the at least one moderator element.

* * * * *